(12) United States Patent
Kim et al.

(10) Patent No.: US 11,885,884 B2
(45) Date of Patent: Jan. 30, 2024

(54) CAMERA MODULE

(71) Applicant: LG INNOTEK CO., LTD., Seoul (KR)

(72) Inventors: Dae Geun Kim, Seoul (KR); Chang Hyuck Lee, Seoul (KR); Hyeong Jin Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 298 days.

(21) Appl. No.: 17/438,085

(22) PCT Filed: Mar. 11, 2020

(86) PCT No.: PCT/KR2020/003367
§ 371 (c)(1),
(2) Date: Sep. 10, 2021

(87) PCT Pub. No.: WO2020/184969
PCT Pub. Date: Sep. 17, 2020

(65) Prior Publication Data
US 2022/0244390 A1 Aug. 4, 2022

(30) Foreign Application Priority Data

Mar. 11, 2019 (KR) .................. 10-2019-0027786
Mar. 11, 2019 (KR) .................. 10-2019-0027787

(51) Int. Cl.
*G01S 17/894* (2020.01)
*G01S 7/4863* (2020.01)
(Continued)

(52) U.S. Cl.
CPC ............. *G01S 17/894* (2020.01); *G01S 7/487* (2013.01); *G01S 7/4863* (2013.01); *G01S 7/493* (2013.01); *G01S 7/4914* (2013.01)

(58) Field of Classification Search
CPC ...... G01S 17/894; G01S 7/4863; G01S 7/487; G01S 7/4914; G01S 7/493; G01S 7/4816;
(Continued)

(56) References Cited

U.S. PATENT DOCUMENTS

2008/0291290 A1* 11/2008 Sonoda ................. H04N 25/63
348/222.1
2011/0310280 A1 12/2011 Goto
(Continued)

FOREIGN PATENT DOCUMENTS

CN 102289131 A 12/2011
CN 106030239 A 10/2016
(Continued)

*Primary Examiner* — Oschta I Montoya
(74) *Attorney, Agent, or Firm* — Birch, Stewart, Kolasch & Birch, LLP

(57) ABSTRACT

An embodiment of the present invention discloses a camera module including a light output unit configured to output an optical signal to an object; an optical unit configured to pass the optical signal reflected from the object; a sensor configured to receive the optical signal passed by the optical unit; and a control unit configured to acquire depth information of the object using the optical signal received by the sensor, wherein the sensor includes an effective area in which a light receiving element is disposed and an ineffective area other than the effective area and includes a first row region, in which the effective area and the ineffective area are alternately disposed in a row direction, and a second row region, in which the effective area and the ineffective area are alternately disposed in the row direction and the effective area is disposed at a position not overlapping the effective area of the first row region in a column direction, light that reaches the effective area of the first row region is controlled by first shifting control to reach the ineffective area of the first row region or the ineffective area of the second row region, and light that reaches the effective area of the second (Continued)

row region is controlled by the first shifting control to reach the ineffective area of the second row region or the ineffective area of the first row region.

13 Claims, 22 Drawing Sheets

(51) Int. Cl.
  *G01S 7/487* (2006.01)
  *G01S 7/4914* (2020.01)
  *G01S 7/493* (2006.01)

(58) Field of Classification Search
  CPC .... H04N 13/254; H04N 13/271; H04N 23/00; H04N 25/70
  See application file for complete search history.

(56) References Cited

U.S. PATENT DOCUMENTS

| | | | |
|---|---|---|---|
| 2015/0049224 A1* | 2/2015 | Morita | H01L 27/14616 348/294 |
| 2015/0097998 A1 | 4/2015 | Kato et al. | |
| 2015/0138328 A1* | 5/2015 | Yokohama | A61B 1/045 348/65 |
| 2015/0179692 A1* | 6/2015 | Furuta | H01L 27/14623 438/69 |
| 2016/0349369 A1 | 12/2016 | Lee et al. | |
| 2017/0347018 A1 | 11/2017 | Ishii | |
| 2018/0115692 A1* | 4/2018 | Du | H04N 23/667 |
| 2018/0197275 A1 | 7/2018 | Price et al. | |

FOREIGN PATENT DOCUMENTS

| | | |
|---|---|---|
| CN | 107454310 A | 12/2017 |
| JP | 2007-42933 A | 2/2007 |
| JP | 2017-5509 A | 1/2017 |
| KR | 10-1020999 B1 | 3/2011 |
| KR | 10-1629610 B1 | 6/2016 |
| KR | 10-2016-0090464 A | 8/2016 |

* cited by examiner

[FIG.1]
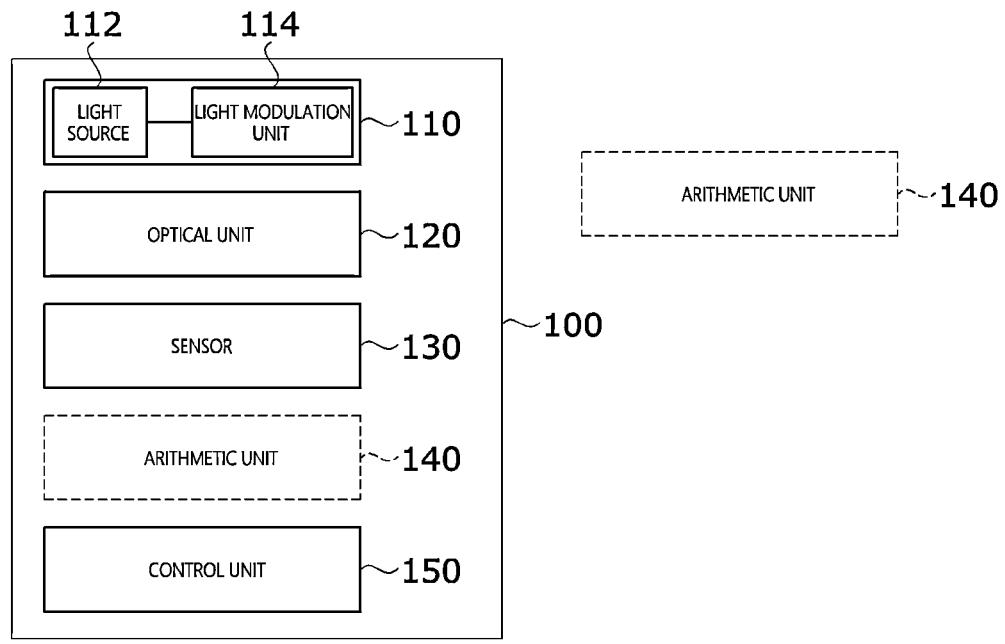
[FIG.2]
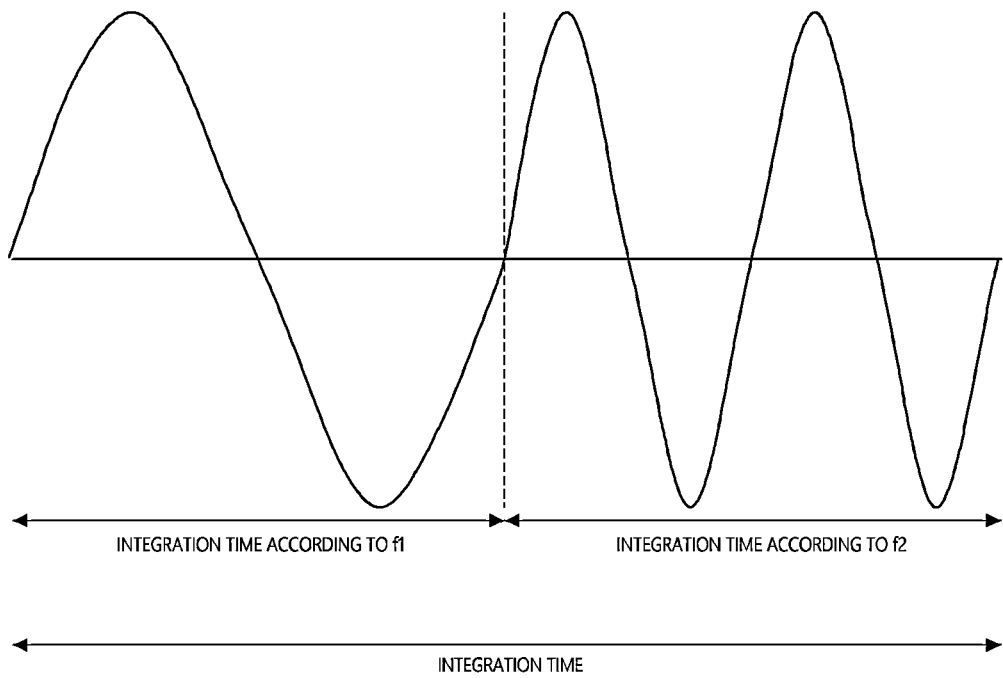

[FIG.3]
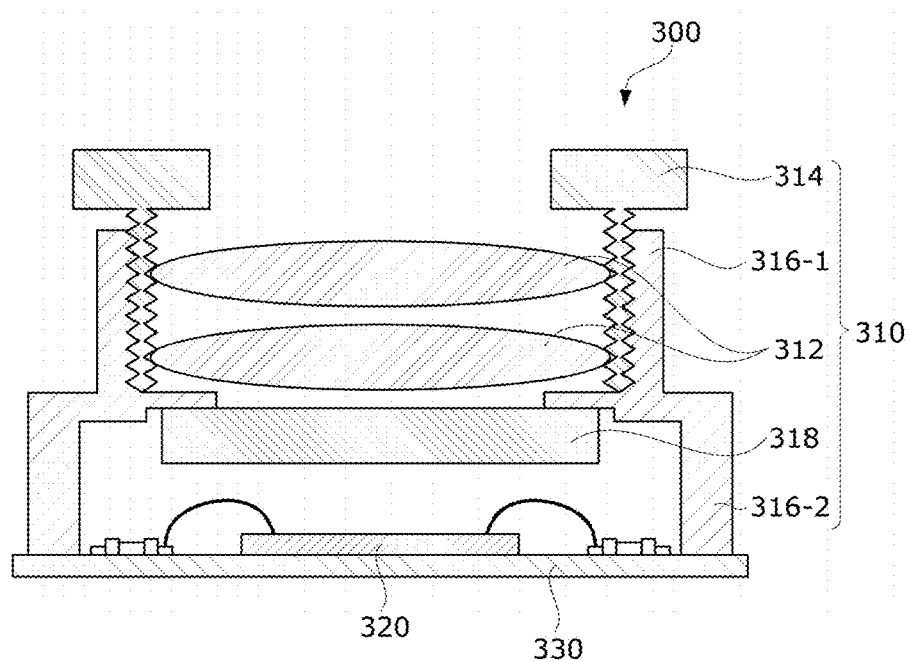
[FIG.4]
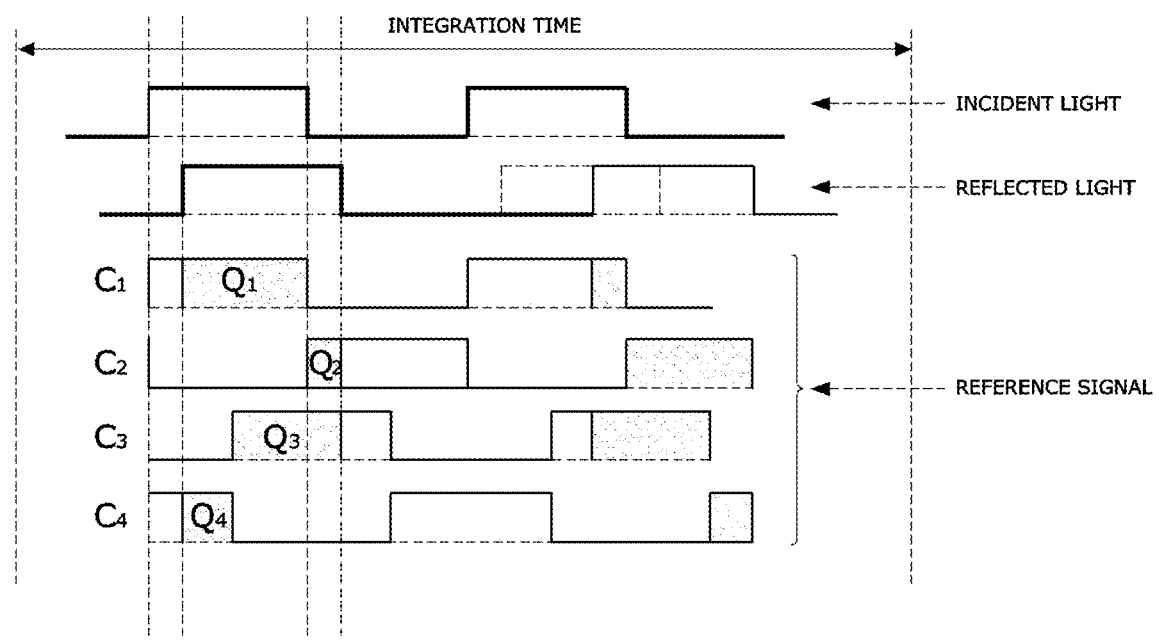

[FIG.5]
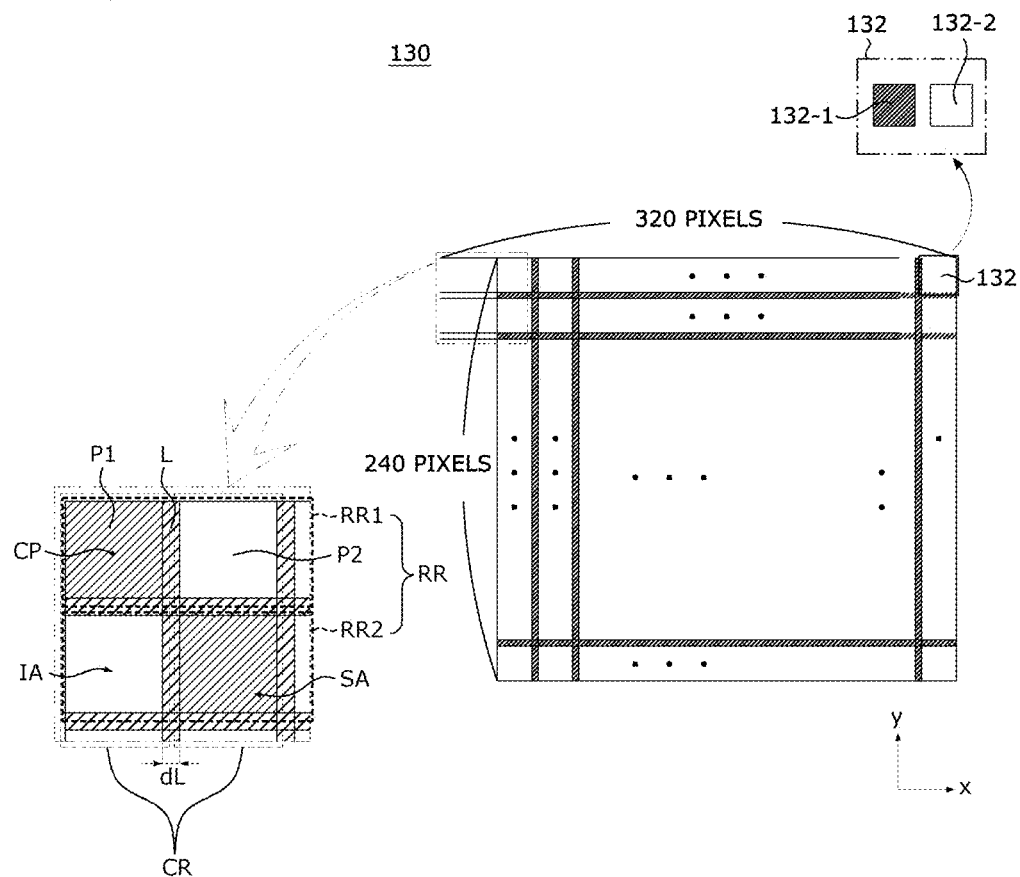
[FIG.6]
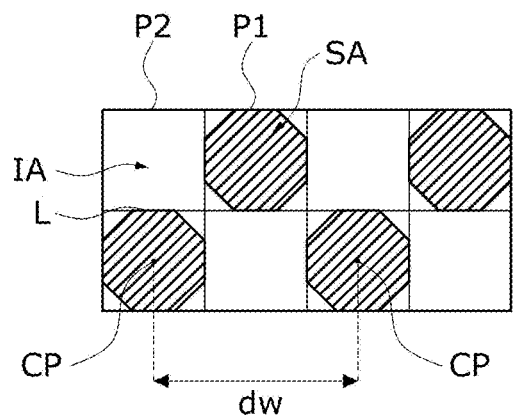

[FIG.7]
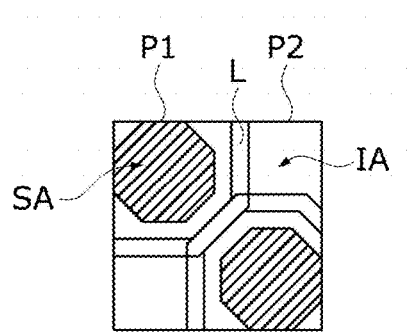
[FIG.8]
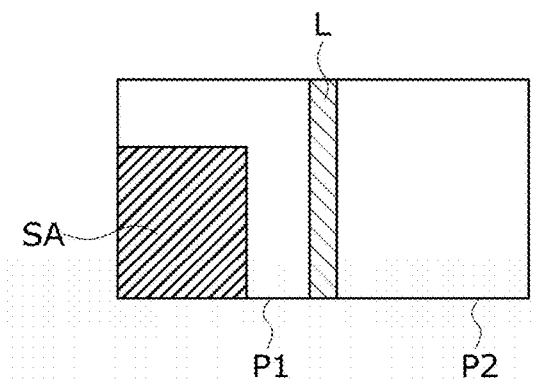
[FIG.9]
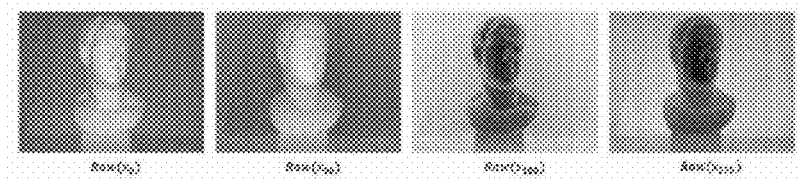

[FIG.10]
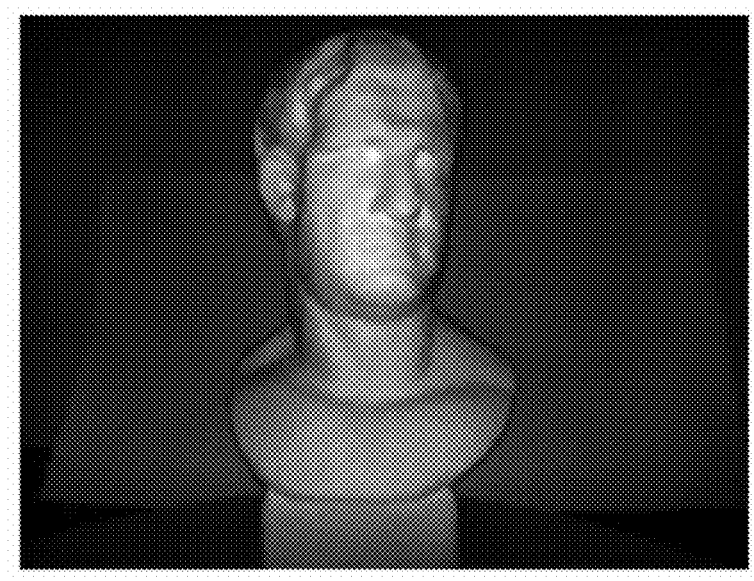
[FIG.11]
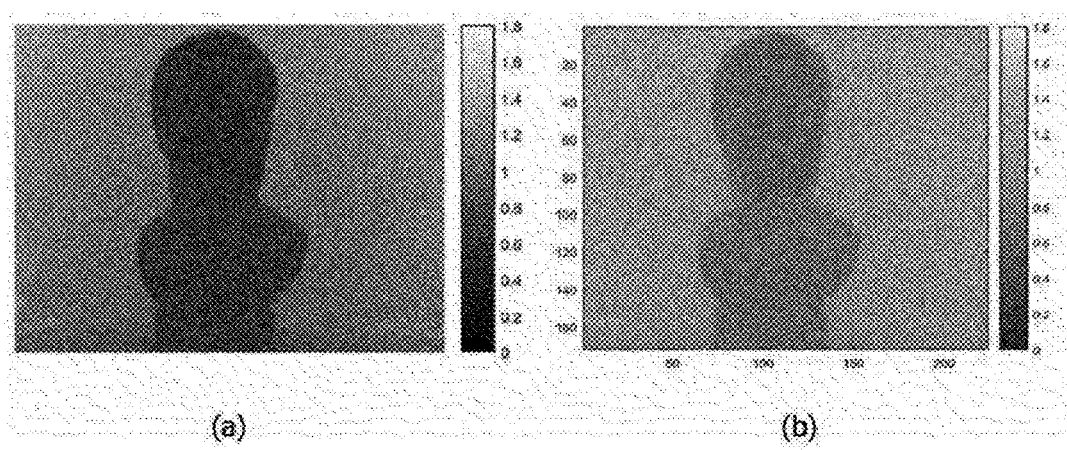

[FIG.12]
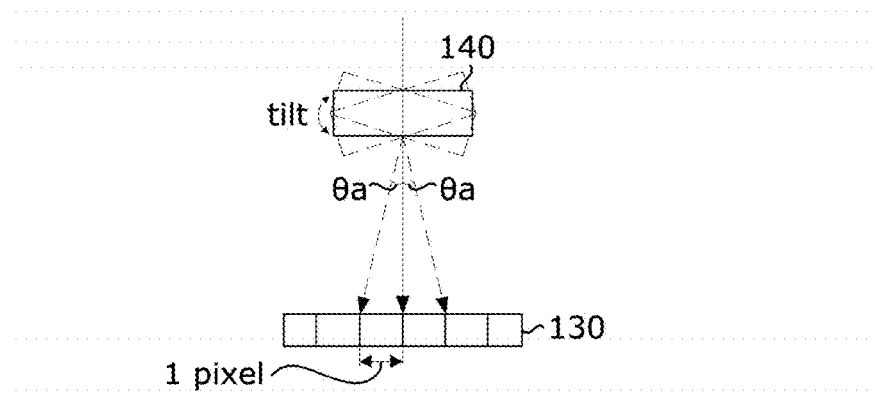
[FIG.13A]
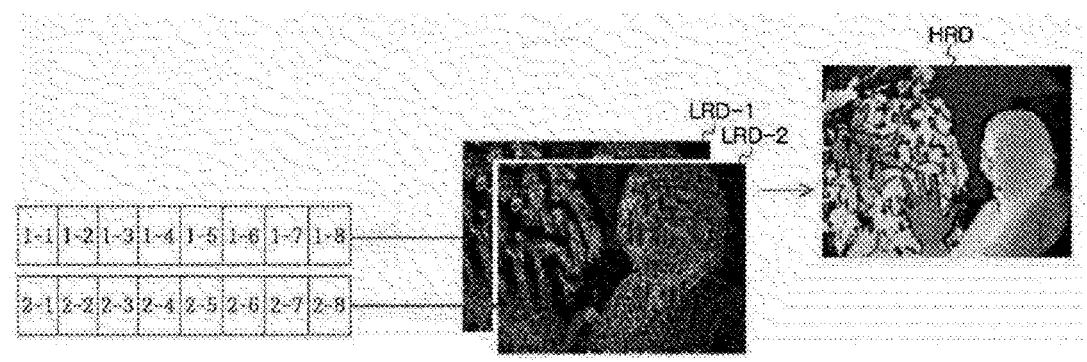

[FIG.13B]
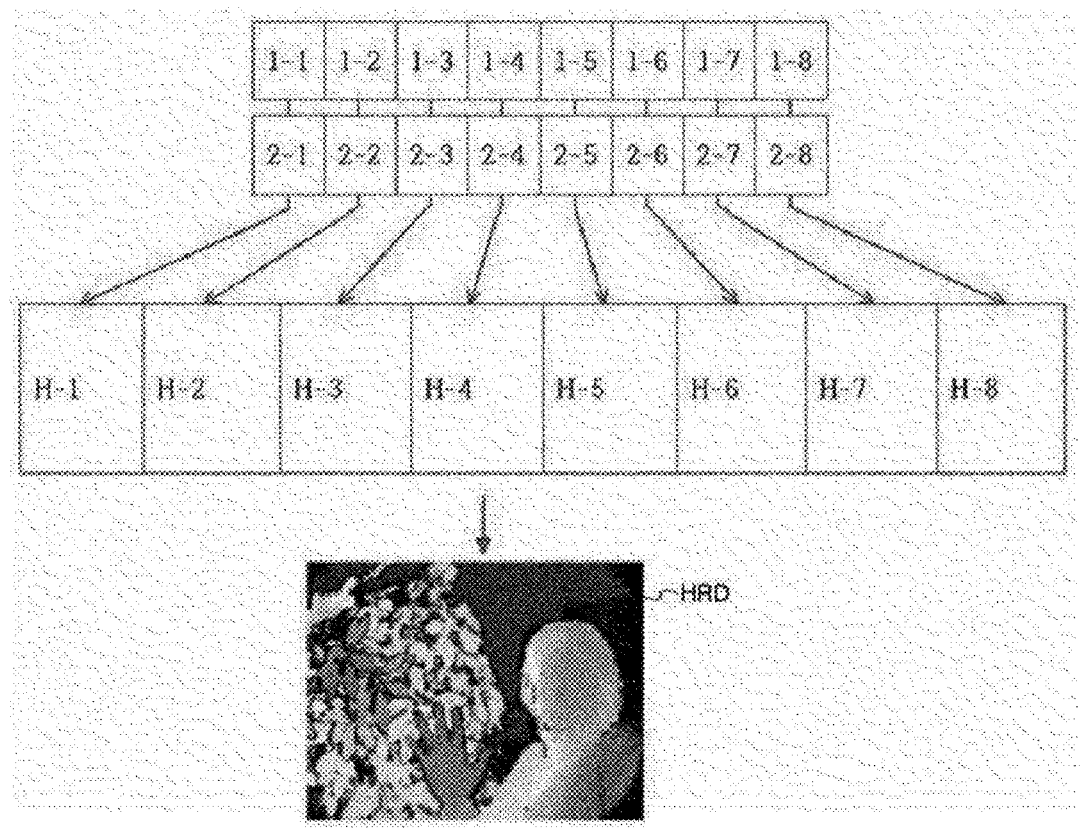
[FIG.13C]
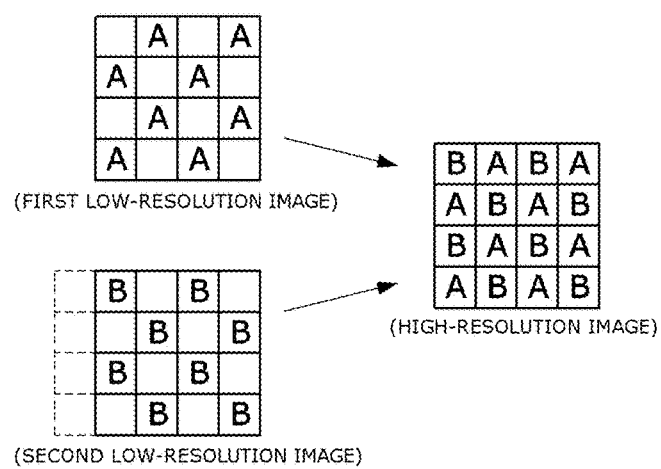
(FIRST LOW-RESOLUTION IMAGE)
(SECOND LOW-RESOLUTION IMAGE)
(HIGH-RESOLUTION IMAGE)

[FIG.13D]
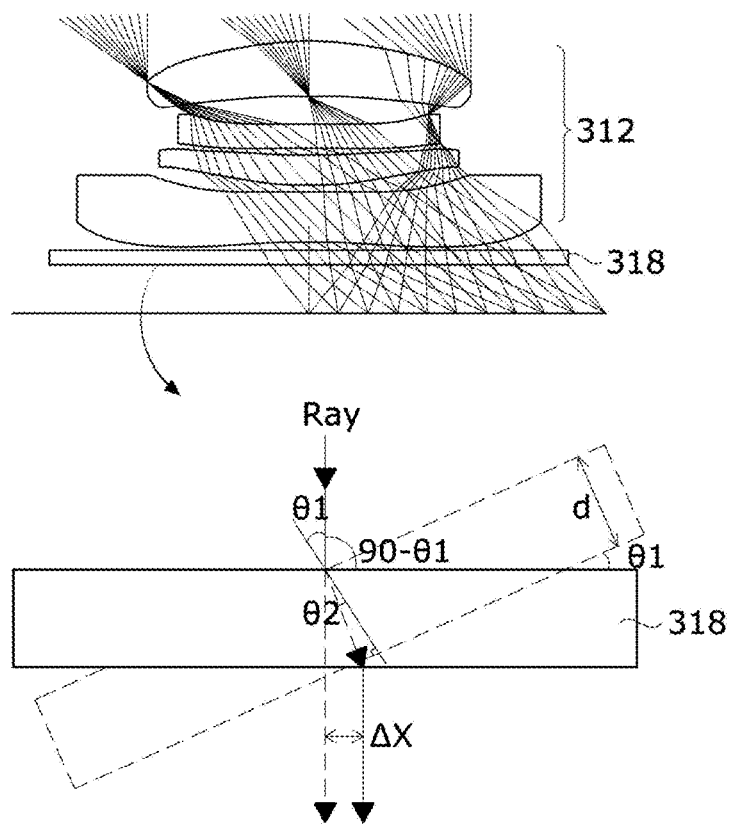

[FIG.13E]
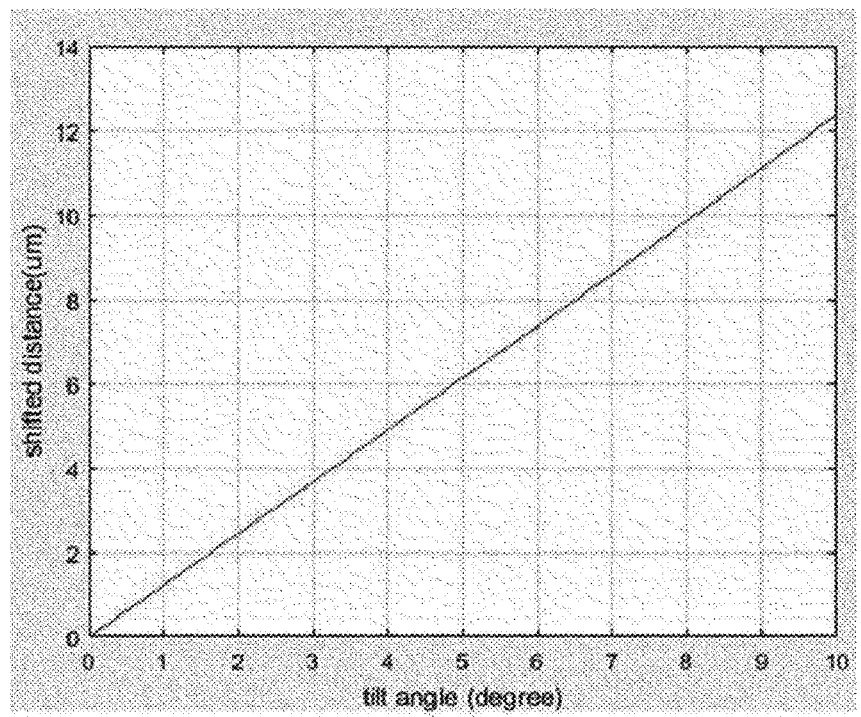

[FIG.14]
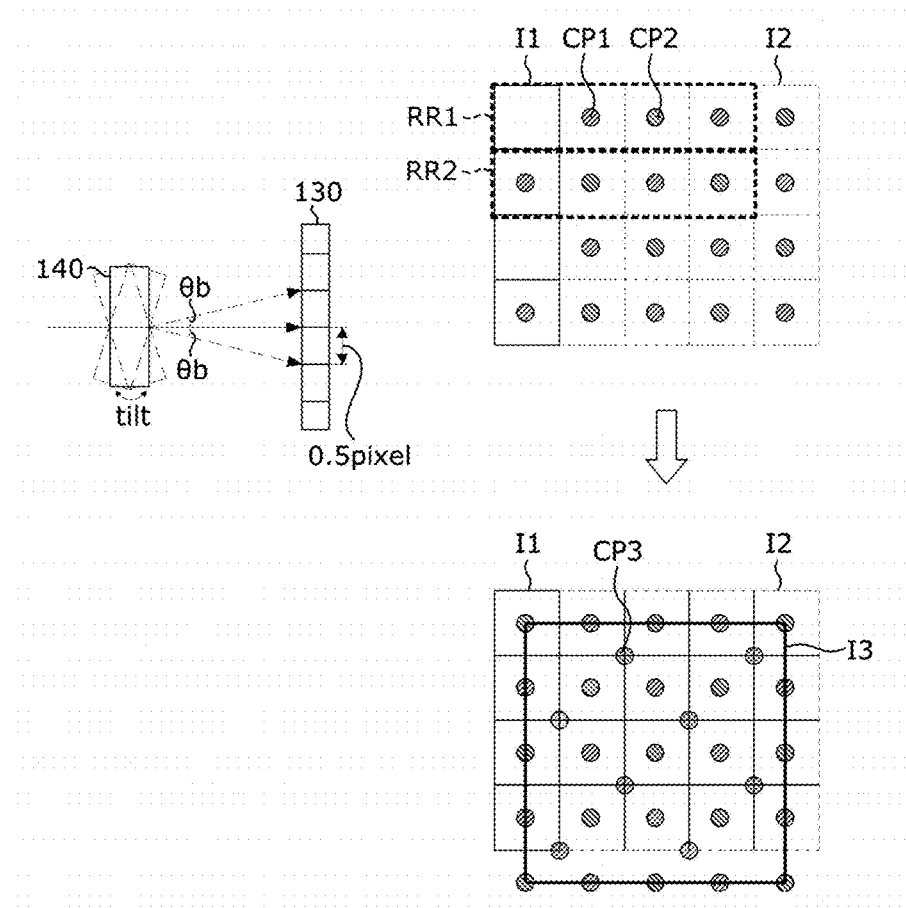
[FIG.15A]
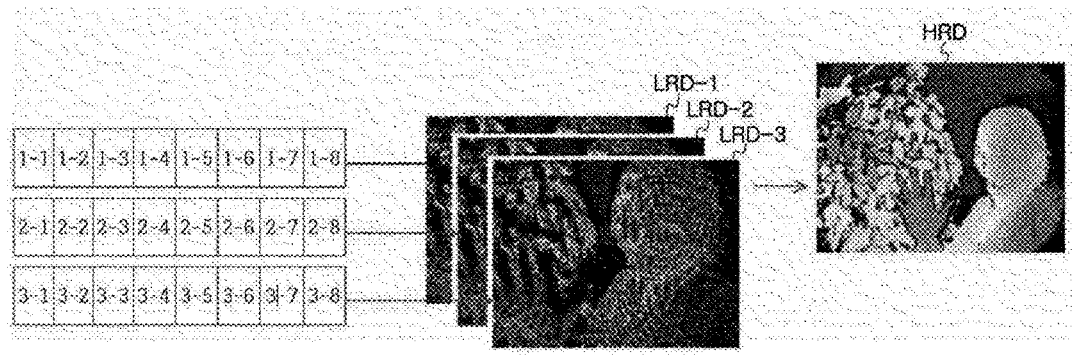

[FIG.15B]
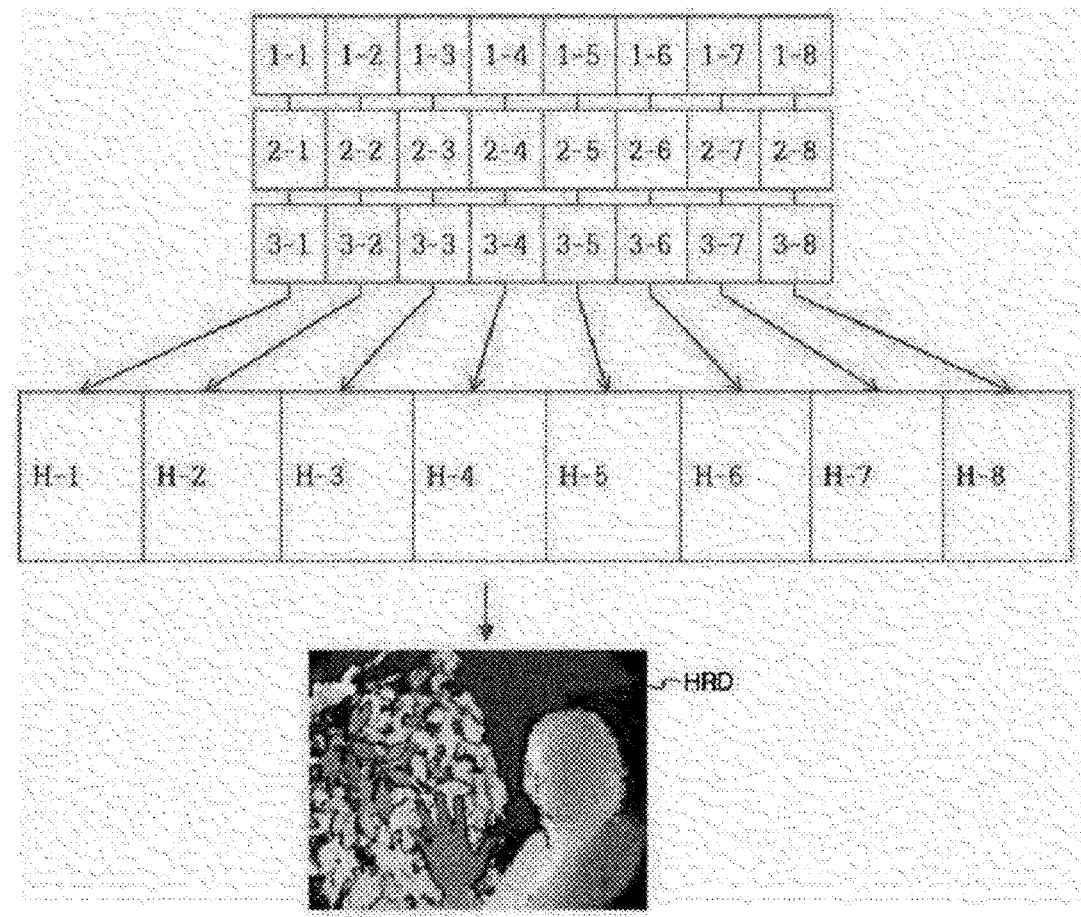

[FIG.15C]
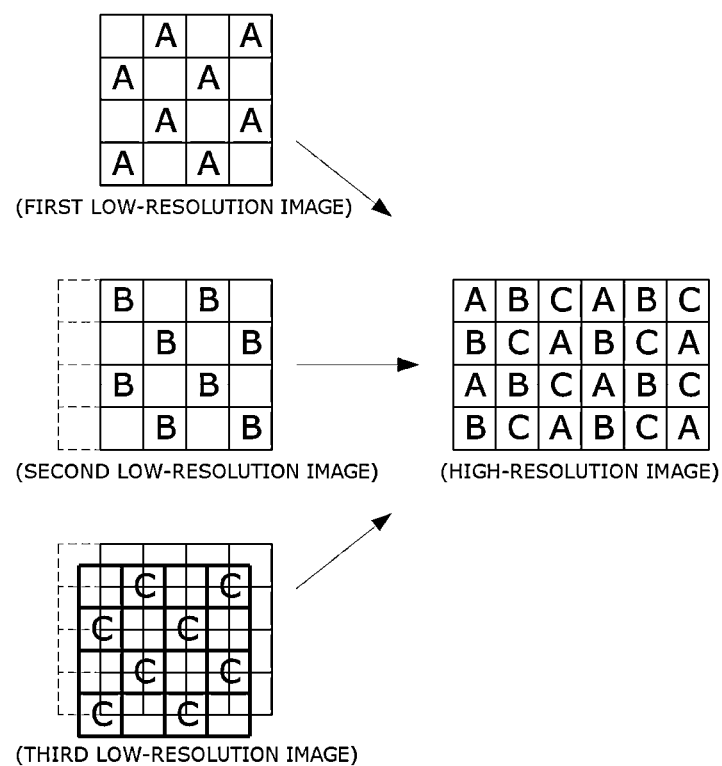

[FIG.16]
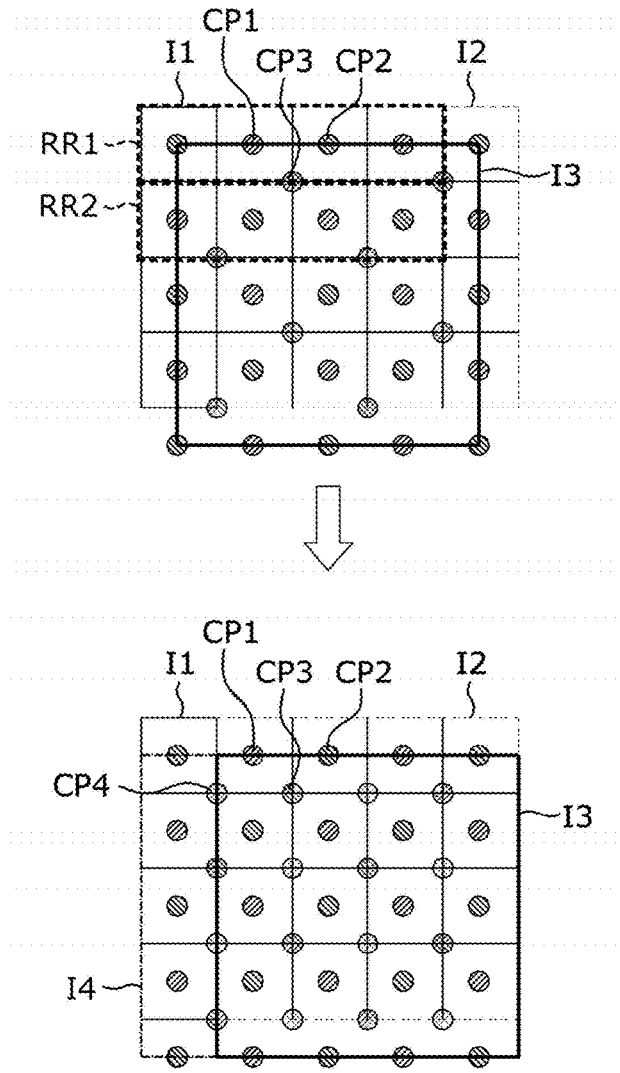
[FIG.17A]
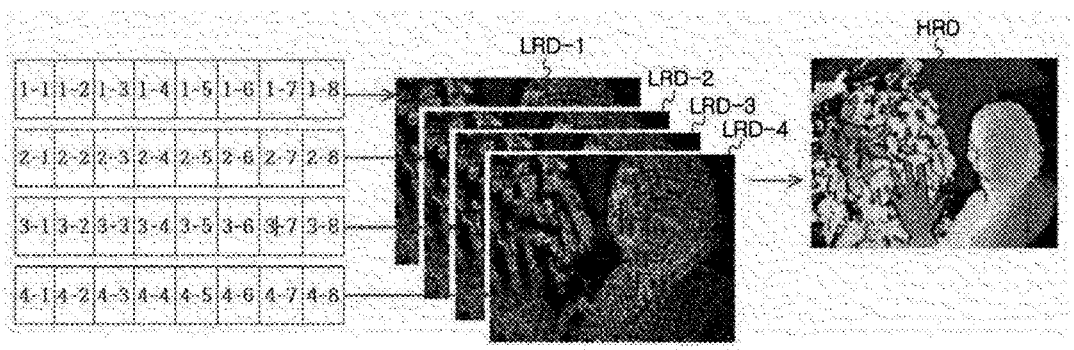

[FIG.17B]
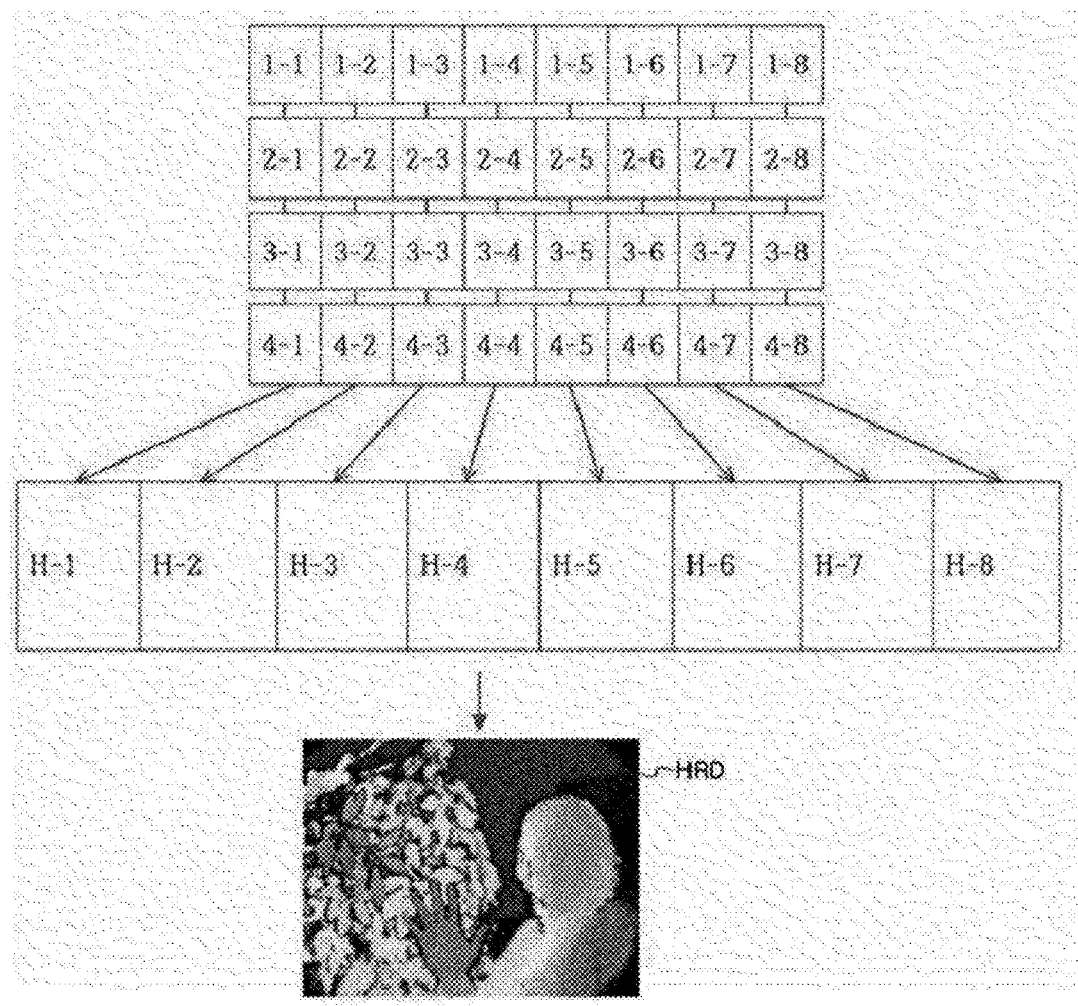

[FIG.17C]
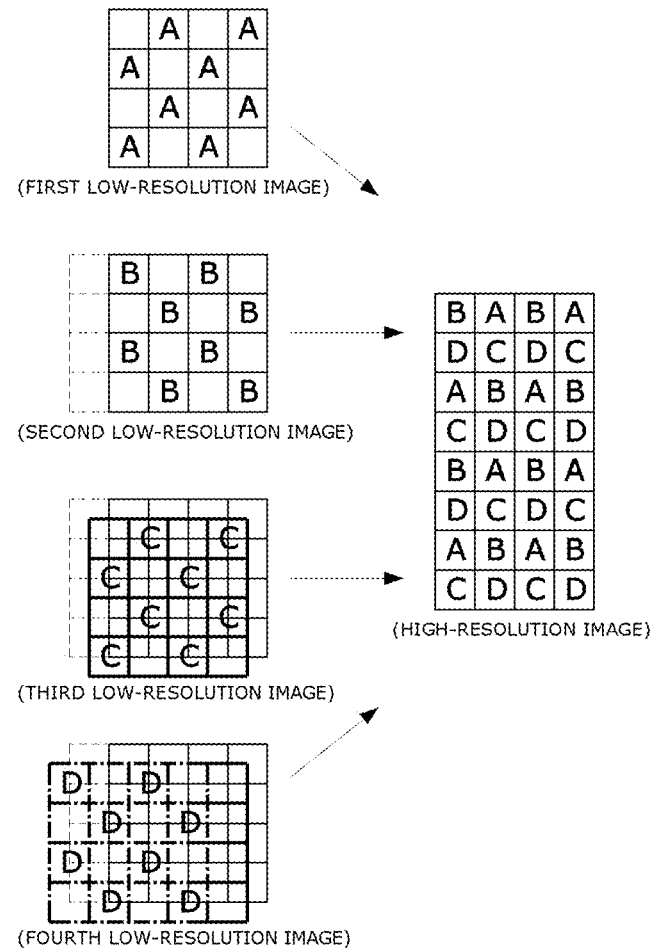
[FIG.18]
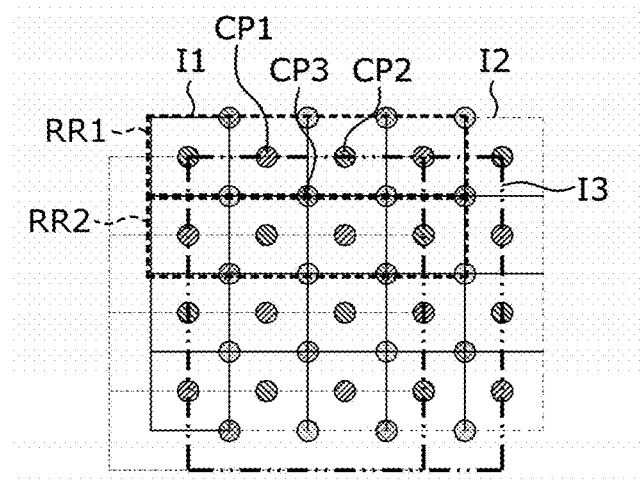

[FIG.19A]
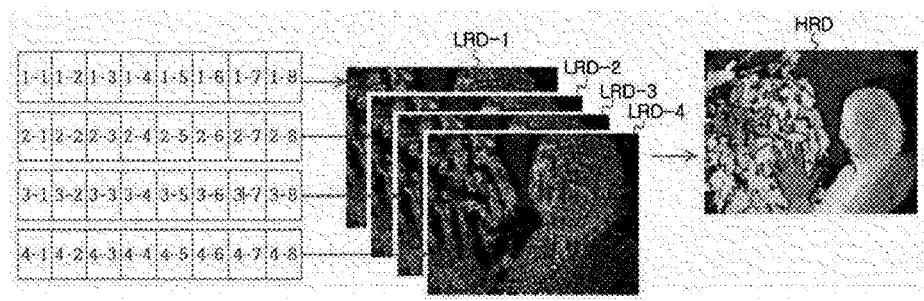
[FIG.19B]
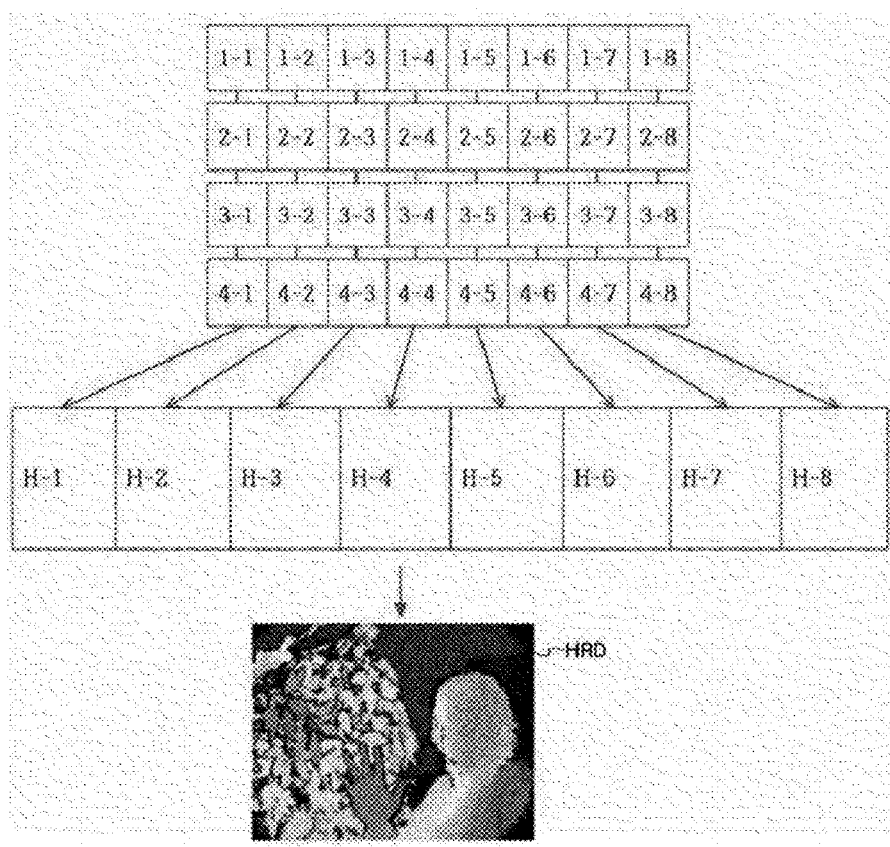

[FIG.19C]
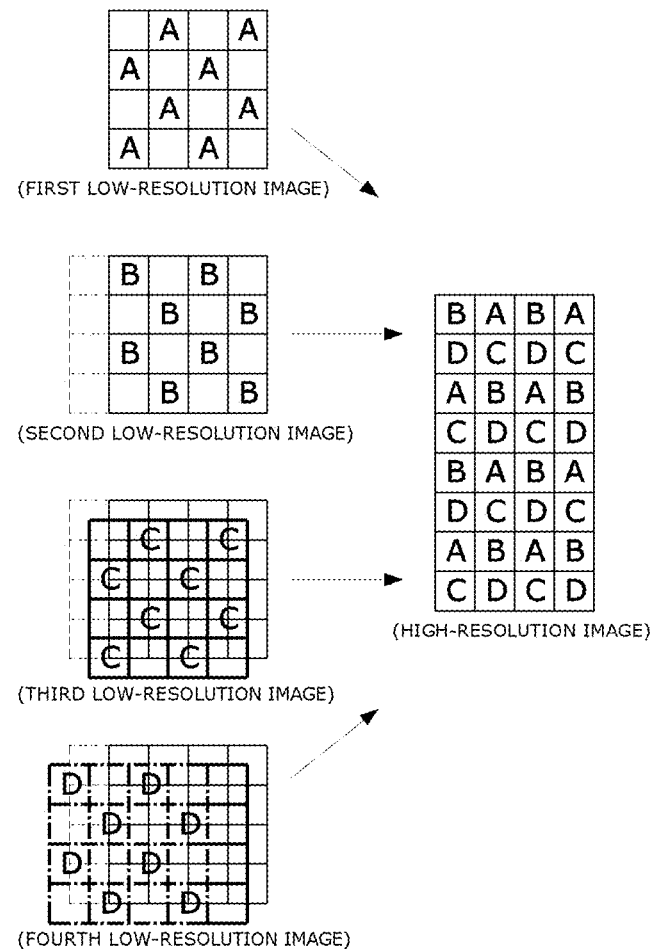
[FIG.20]
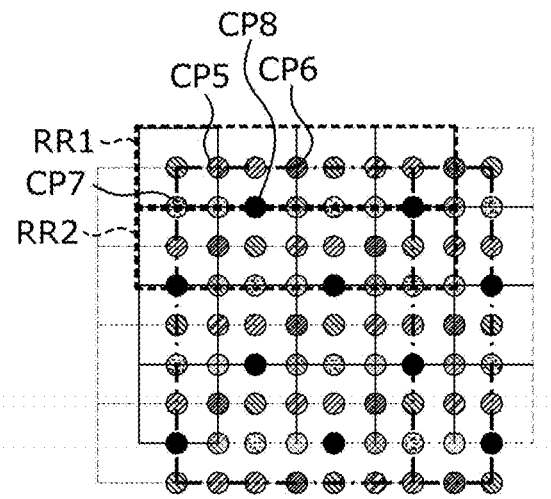

[FIG.21A]
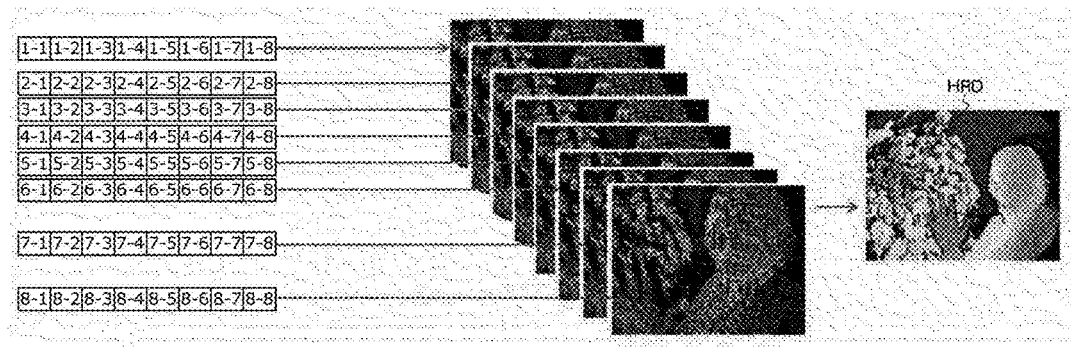
[FIG.21B]
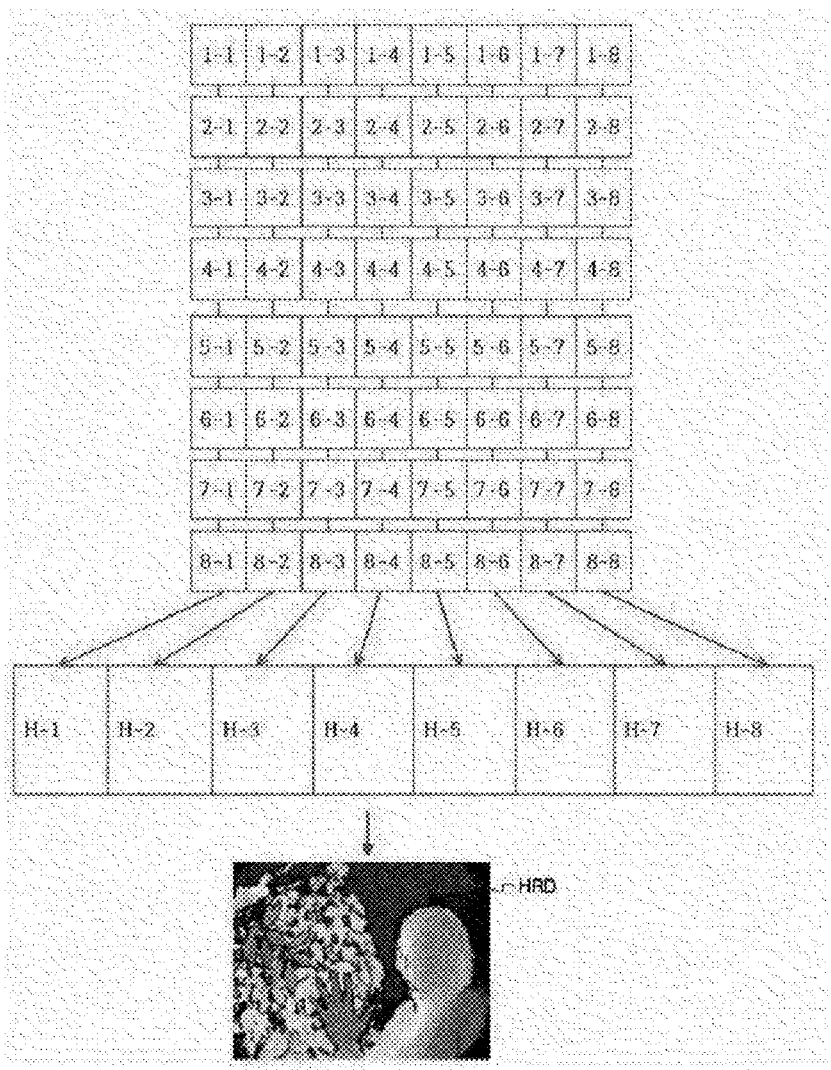

[FIG.21C]
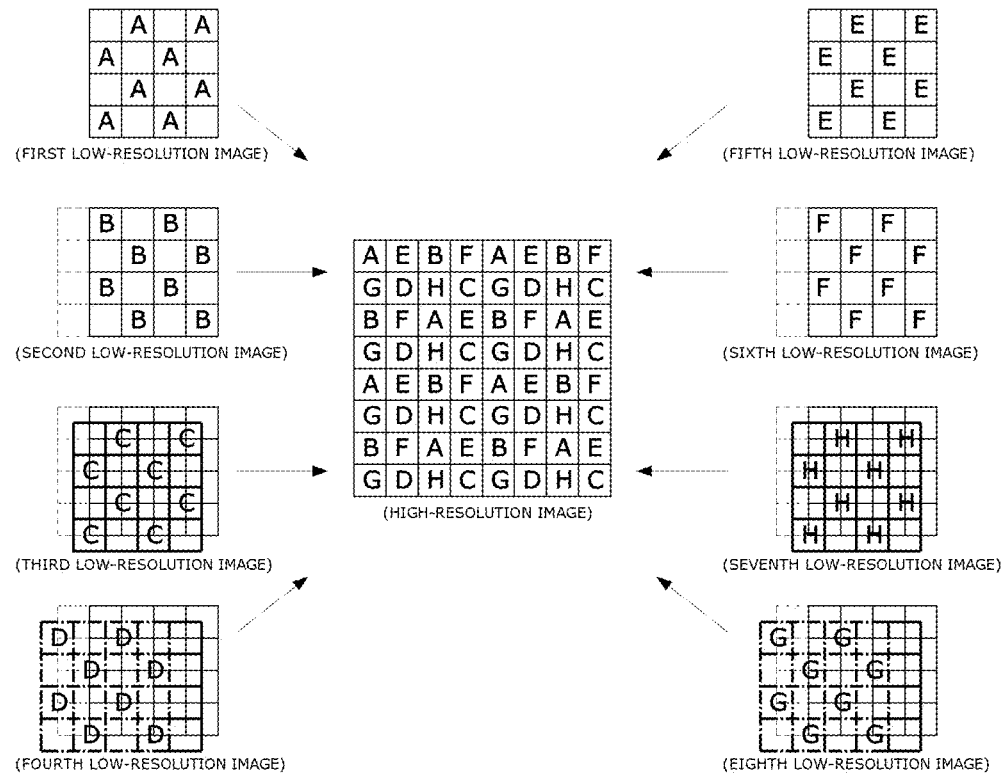
[FIG.22]
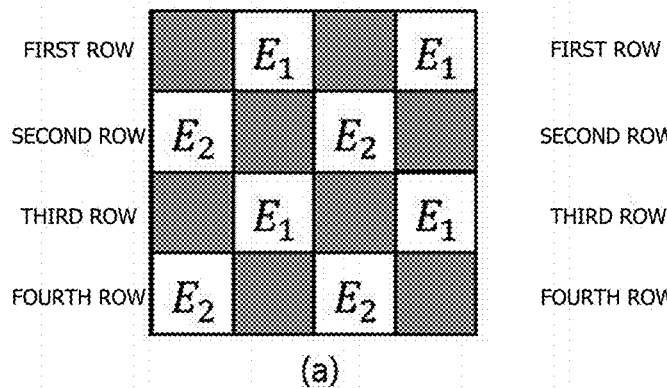
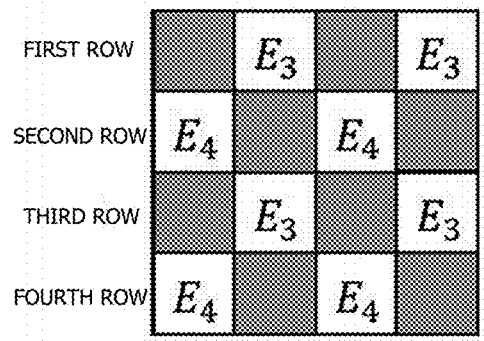

[FIG.23]
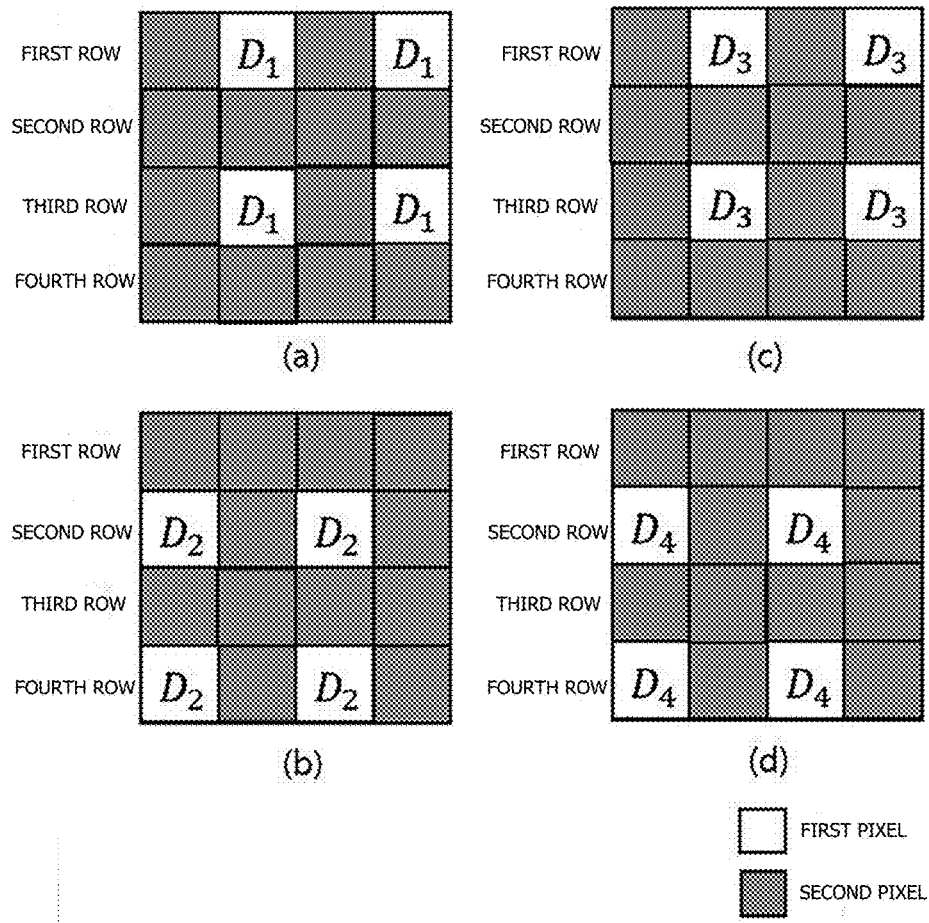
[FIG.24]
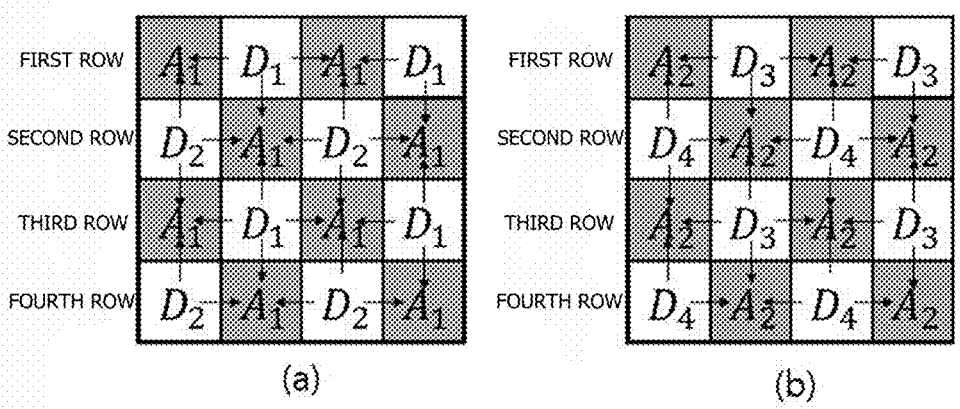

[FIG.25]
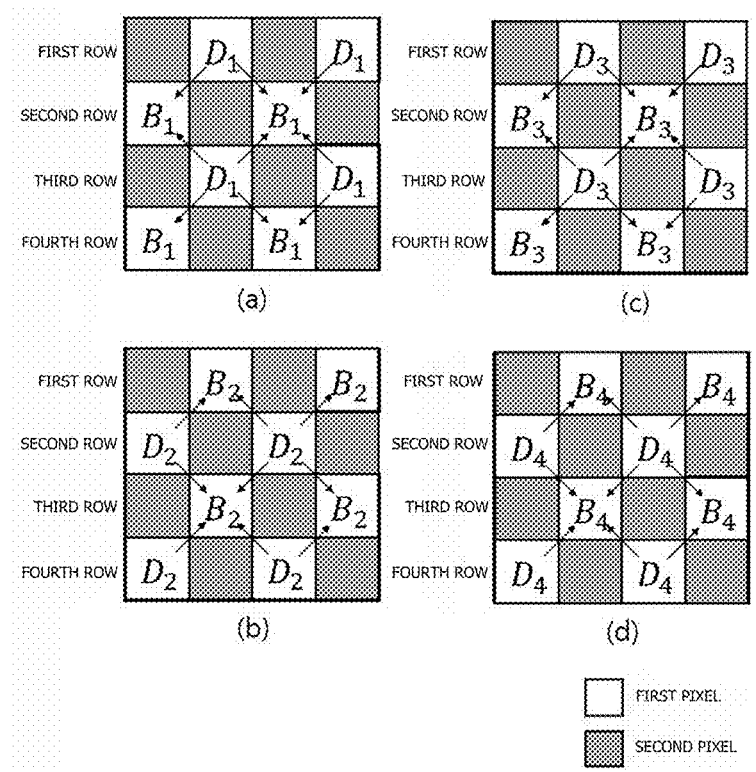
[FIG.26]
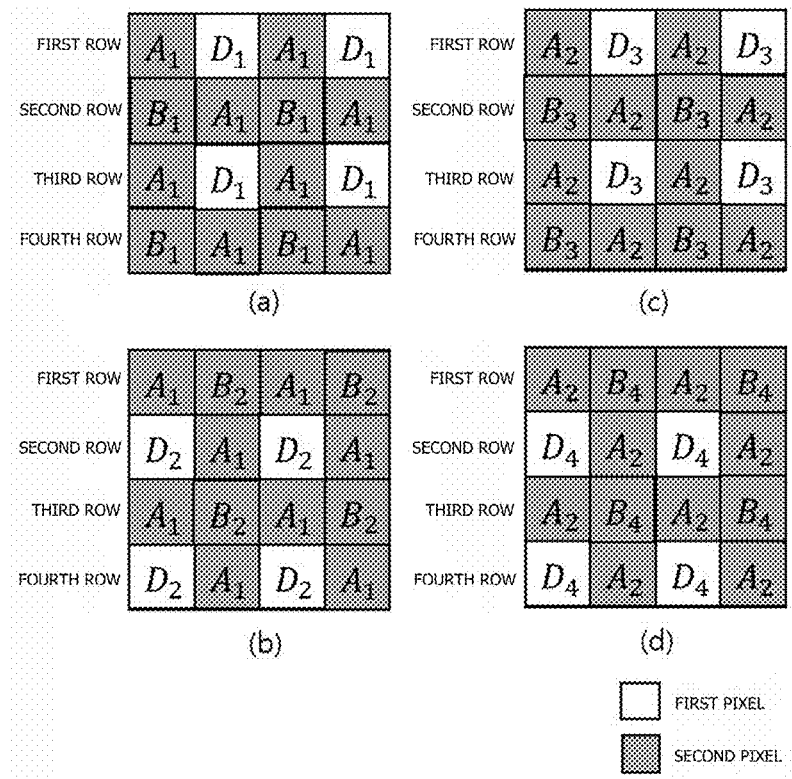

[FIG.27]
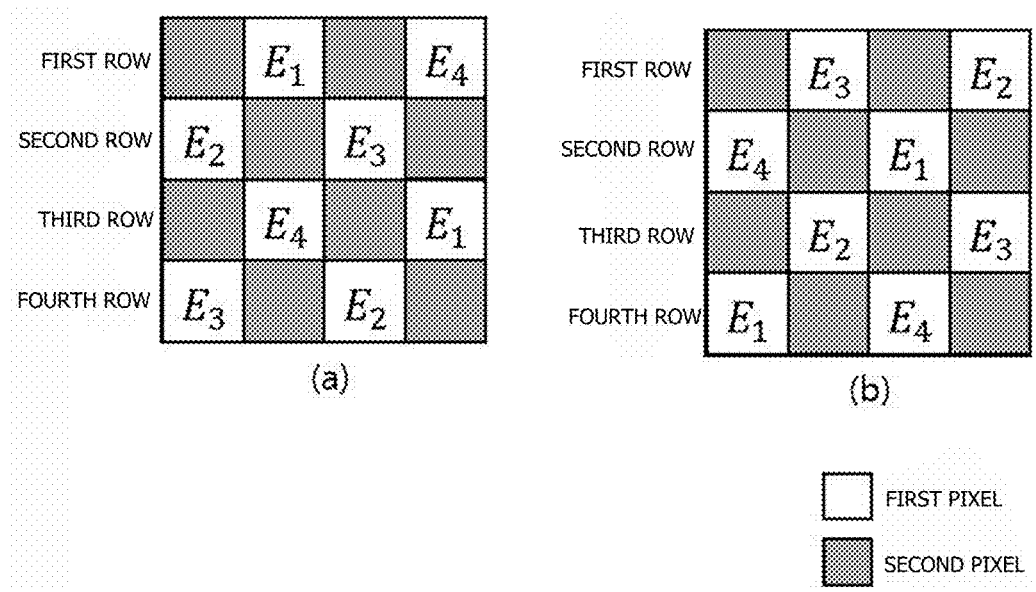

CAMERA MODULE

CROSS REFERENCE TO RELATED APPLICATIONS

This application is the National Phase of PCT/KR2020/003367 filed on Mar. 11, 2020, which claims priority under 35 U.S.C. § 119(a) to Patent Application Nos. 10-2019-0027786 and 10-2019-0027787 both filed on Mar. 11, 2019 in the Republic of Korea, all of which are hereby expressly incorporated by reference into the present application.

TECHNICAL FIELD

The present invention relates to a camera module capable of extracting depth information.

BACKGROUND ART

Three-dimensional content is applied in many fields such as education, manufacturing, and autonomous driving, as well as games and culture. Depth information (depth map) is required to acquire three-dimensional content. Depth information is information indicating a distance in a space and indicates perspective information at one point in a two-dimensional image with respect to another point therein.

A method in which infrared (IR) structured light is projected onto an object, a method in which a stereo camera is used, a time-of-flight (ToF) method and the like are used as methods of acquiring depth information. According to the ToF method, a distance from an object is calculated using information of light that is reflected back after shooting light. The greatest advantage of the ToF method is that it rapidly provides distance information on a three-dimensional space in real time. Also, it allows a user to obtain accurate distance information without applying a separate algorithm or performing correction in terms of hardware. In addition, it allows accurate depth information to be acquired even when a very close subject is measured or a moving subject is measured.

RELATED ART DOCUMENT

Patent Document (Patent Document 1) U.S. Pat. No. 6,437,307

DISCLOSURE

Technical Problem

The present invention is directed to providing a camera module capable of extracting depth information using a time-of-flight (ToF) method.

Technical Solution

One embodiment of the present invention provides a camera module including: a light output unit configured to output an optical signal to an object; an optical unit configured to pass the optical signal reflected from the object; a sensor configured to receive the optical signal passed by the optical unit; and a control unit configured to acquire depth information of the object using the optical signal received by the sensor, wherein the sensor includes an effective area in which a light receiving element is disposed and an ineffective area other than the effective area and includes a first row region, in which the effective area and the ineffective area are alternately disposed in a row direction, and a second row region, in which the effective area and the ineffective area are alternately disposed in the row direction and the effective area is disposed at a position not overlapping the effective area of the first row region in a column direction, light that reaches the effective area of the first row region is controlled by first shifting control to reach the ineffective area of the first row region or the ineffective area of the second row region, and light that reaches the effective area of the second row region is controlled by the first shifting control to reach the ineffective area of the second row region or the ineffective area of the first row region.

Light that reaches the ineffective area of the first row region may be controlled by second shifting control to shift toward the ineffective area of the second row region that is adjacent to the ineffective area of the first row region.

The light that reaches the effective area of the first row region may be controlled by the second shifting control to shift toward the effective area of the second row region that is adjacent to the effective area of the first row region.

A travel distance of the sensor of light that reaches the sensor by the first shifting control on a plane may be different from a travel distance of light that reaches the sensor by the second shifting control on the plane of the sensor.

On the plane of the sensor, the travel distance of the light by the first shifting control may be greater than the travel distance of the light that reaches the sensor by the second shifting control.

The travel distance of the light on the plane of the sensor by the first shifting control may be 0.3 to 0.7 times a distance between centers of adjacent effective areas in the same row region.

The travel distance of the light on the plane of the sensor by the second shifting control may be 0.3 to 0.7 times a distance between a center of the effective area of the first row region and a center of the second row region that is adjacent to the effective area of the first row region.

On the plane of the sensor, the travel distance of the light by the first shifting control may be 0.5 to 1 times the travel distance of the light by the second shifting control.

An optical path may be controlled by the optical unit to control light received by the effective area of the first row region to reach the ineffective area of the first row region and shift-control light received by the effective area of the second row region to reach the ineffective area of the second row region.

The optical unit may include an infrared pass filter, and the infrared pass filter may be tilted and controlled by the shifting control.

The optical unit may include a variable lens whose focal point is adjustable, and the variable lens may be adjusted and controlled by the shifting control.

The variable lens may include at least one of a liquid lens, which includes at least one liquid, a polymer lens, a liquid crystal lens, a voice coil motor (VCM) lens, a shape memory alloy (SMA) lens, and a microelectromechanical system (MEMS) lens.

The camera module may include an arithmetic unit configured to acquire depth information of the object by using a time difference between the optical signal output from the light output unit and the optical signal received by the sensor or using a plurality of pieces of information acquired during a plurality of integration times of the sensor during which the effective area of the sensor is integrated at different phases.

The arithmetic unit may acquire depth information of higher resolution than the sensor by using pieces of information acquired by the sensor before the shifting control and after the shifting control.

The arithmetic unit may apply interpolation between the light that reaches the sensor by the first shifting control and the light that reaches the sensor by the second shifting control and compute light that reaches a center of the most adjacent light reaching the sensor by the first shifting control and light that is most adjacent to the most adjacent light reaching the sensor by the first shifting control.

Advantageous Effects

When a camera module according to an embodiment of the present invention is used, it is possible to acquire depth information at a high resolution by shifting an optical path of an incident light signal without significantly increasing the number of pixels of a sensor.

Also, according to an embodiment of the present invention, because an extent to which the optical path of the incident light signal is shifted can be detected without significantly changing a hardware configuration of a device, it is possible to acquire depth information of super-resolution.

Also, it is possible to provide a camera module having a significantly improved resolution compared to the number of pixels of the sensor by shifting the optical path of the incident light signal and applying an interpolation technique.

In addition, it is possible to provide a camera module that is capable of easily computing depth information so that the amount of data processed is reduced.

DESCRIPTION OF DRAWINGS

FIG. 1 is a block diagram of a camera module according to an embodiment of the present invention.

FIG. 2 is a view for describing a frequency of an optical signal according to an embodiment.

FIG. 3 is a cross-sectional view of a camera module according to an embodiment.

FIG. 4 is a view for describing an electrical signal generation process according to an embodiment.

FIG. 5 is a view for describing a sensor according to an embodiment.

FIGS. 6 to 8 are views for describing a sensor according to a modified embodiment.

FIG. 9 is a raw image relating to four phases that is obtained from a camera module according to an embodiment.

FIG. 10 is an amplitude image obtained from a camera module according to an embodiment.

FIG. 11 is a depth image obtained from a camera module according to an embodiment.

FIG. 12 is a view for describing changing an optical path of an input light signal by a control unit of a camera module according to an embodiment.

FIGS. 13A and 13B are views for describing driving for obtaining a high-resolution image by a camera module according to an embodiment.

FIG. 13C is a view for describing a pixel value arrangement process of a camera module according to an embodiment.

FIGS. 13D and 13E are views for describing an effect in which an image frame input to a sensor is shifted according to IR filter slope control.

FIG. 14 and FIGS. 15A to 15C are views for describing driving for obtaining a high-resolution image by a camera module according to an embodiment.

FIG. 16 and FIGS. 17A to 17C are views for describing driving for obtaining a high-resolution image by a camera module according to an embodiment.

FIG. 18 and FIGS. 19A to 19C are views for describing driving for obtaining a high-resolution image by a camera module according to an embodiment.

FIG. 20 and FIGS. 21A to 21C are views for describing driving for obtaining a high-resolution image by a camera module according to an embodiment.

FIG. 22 is a view for describing an operation mechanism of a sensor according to an embodiment of the present invention.

FIG. 23 is a view for describing first pixel information according to an embodiment of the present invention.

FIGS. 24 and 25 are views for describing a process of computing second pixel information according to an embodiment of the present invention.

FIG. 26 is a view illustrating four sub-frames according to an embodiment.

FIG. 27 is a view for describing an operation mechanism of a sensor according to an embodiment of the present invention.

MODES OF THE INVENTION

Hereinafter, exemplary embodiments of the present invention will be described in detail with reference to the accompanying drawings.

However, the technical idea of the present invention is not limited to some embodiments described herein and may be implemented in various other forms. One or more elements of different embodiments may be selectively combined with or substituted by one another within the scope of the technical idea of the present invention.

Also, unless otherwise defined, all terms, including technical and scientific terms, used in the embodiments of the present invention may be construed as having the same meaning as commonly understood by one of ordinary skill in the art to which the present invention pertains. Generally-used terms, such as those defined in dictionaries, should be construed as having a meaning that is consistent with their meaning in the context of the relevant art.

In addition, the terms used in the embodiments of the present invention are for describing the embodiments and are not intended to limit the present invention.

In the present specification, a singular expression may include a plural expression unless the context clearly indicates otherwise. "At least one (or one or more) of A, B, and C" may include one or more of any combination that is possible by combining A, B, and C.

Also, terms such as first, second, A, B, (a), and (b) may be used in describing elements of the embodiments of the present invention.

The terms are only for distinguishing the elements from other elements, and the essence, order, or the like of the corresponding elements are not limited by the terms.

In addition, a case in which a certain element is described as being "connected," "coupled," or "linked" to another element may include not only a case in which the element is directly connected, combined, or linked to the other element but also a case in which the element is "connected,"

"coupled," or "linked" to the other element via another element disposed therebetween.

Also, a case in which a certain element is described as being formed or disposed "on (above) or under (below)" another element includes not only a case in which the two elements come in direct contact with each other but also a case in which one or more other elements are formed or disposed between the two elements. Also, "on (above) or under (below)" may include not only an upward direction but also a downward direction with respect to one element.

In addition, a camera module according to the embodiments described below may be used as an optical instrument or one of the devices constituting an optical instrument. First, the optical instrument may include any one of a cellular phone, a mobile phone, a smartphone, a portable smart device, a digital camera, a laptop computer, a digital broadcasting terminal, a personal digital assistant (PDA), a portable multimedia player (PMP), and a navigation system. However, the type of the optical instrument is not limited thereto, and the optical instrument may include any other device for shooting an image or a picture.

The optical instrument may include a main body. The main body may be in the form of a bar. Alternatively, the main body may be of various structures such as a slide type structure, a folder type structure, a swing type structure, and a swirl type structure in which two or more sub-bodies are coupled so as to be movable relative to each other. The main body may include a case (a casing, a housing, or a cover) that forms an exterior of the main body. For example, the main body may include a front case and a rear case. Various electronic components of the optical instrument may be embedded in a space formed between the front case and the rear case.

The optical instrument may include a display. The display may be disposed at one surface of the main body of the optical instrument. The display may output an image. The display may output an image captured by a camera.

The optical instrument may include the camera. The camera may include a time-of-flight (ToF) camera module. The ToF camera module may be disposed at a front surface of the main body of the optical instrument. In this case, the ToF camera module may be used for various types of biometric recognition, such as user's face recognition, iris recognition, and vein recognition for security authentication of the optical instrument.

FIG. 1 is a block diagram of a camera module according to an embodiment of the present invention, FIG. 2 is a view for describing a frequency of an optical signal according to an embodiment, and FIG. 3 is a cross-sectional view of a camera module according to an embodiment.

Referring to FIGS. 1 to 3, a camera module 100 may include a light output unit 110, an optical unit 120, a sensor 130, and a control unit 150. Also, the camera module 100 may include the control unit 150.

The light output unit 110 may be a light emitting module, a light emitting unit, a light emitting assembly, or a light emitting device. Specifically, the light output unit 110 may generate an optical signal and then radiate the generated optical signal to an object. Here, the light output unit 110 may generate and output the optical signal in the form of a pulse wave or a continuous wave. The continuous wave may be in the form of a sinusoidal wave or a squared wave. By the light output unit 110 generating the optical signal in the form of a pulse wave or a continuous wave, the camera module 100 may use a phase difference or a time difference between the optical signal output from the light output unit 110 and an input light signal that is reflected from the object and then input to the camera module 100. In the present specification, output light may refer to light that is output from the light output unit 110 and incident on an object, and input light may refer to light that is input to the camera module 100 after the output light output from the light output unit 110 reaches the object and is reflected from the object. From the standpoint of the object, the output light may be incident light, and the input light may be reflected light.

The light output unit 110 radiates the generated optical signal to the object during a predetermined integration time. Here, the integration time refers to a single frame time. In a case in which a plurality of frames are generated, a set integration time is repeated. For example, in a case in which the camera module 100 shoots an object at 20 frames per second (FPS), the integration time is ½₀ [sec]. Also, in a case in which hundred frames are generated, the integration time may be repeated hundred times.

The light output unit 110 may generate not only an output light signal having a predetermined frequency, but also a plurality of optical signals having different frequencies. Also, the light output unit 110 may sequentially and repeatedly generate a plurality of optical signals having different frequencies. Alternatively, the light output unit 110 may simultaneously generate a plurality of optical signals having different frequencies.

In an embodiment of the present invention, as in FIG. 2, the light output unit 110 may control an optical signal having frequency $f_1$ to be generated during first half of the integration time and control an optical signal having frequency $f_2$ to be generated during the other half of the integration time. According to another embodiment, the light output unit 110 may control some light emitting diodes (LEDs) of a plurality of LEDs to generate the optical signal having frequency $f_1$ and control the remaining LEDs to generate the optical signal having frequency $f_2$. In this way, the light output unit 110 may generate and output signals having different frequencies according to integration time.

To this end, the light output unit 110 may include a light source 112 configured to generate light and a light modulation unit 114 configured to modulate light.

First, the light source 112 generates light. The light generated by the light source 112 may be infrared light whose wavelength is in a range of 770 nm to 3,000 nm or may be visible light whose wavelength is in a range of 380 nm to 770 nm. The light source 112 may use LEDs and have a form in which a plurality of LEDs are arranged according to a predetermined pattern. Further, the light source 112 may include an organic light emitting diode (OLED) or a laser diode (LD). Alternatively, the light source 112 may be a vertical cavity surface emitting laser (VCSEL). The VCSEL is one of laser diodes that converts an electrical signal to an optical signal and may user a wavelength in a range of about 800 to 1,000 nm, e.g., a wavelength of about 850 nm or a wavelength of about 940 nm.

The light source 112 is repeatedly turned on and off at a predetermined time interval to generate an optical signal in the form of a pulse wave or a continuous wave. The predetermined time interval may be a frequency of the optical signal. The turning on and off of the light source 112 may be controlled by the light modulation unit 114.

The light modulation unit 114 controls the turning on and off of the light source 112 so that the light source 112 generates an optical signal in the form of a continuous wave or a pulse wave. The light modulation unit 114 may control the light source 112 to generate an optical signal in the form of a continuous wave or a pulse wave through frequency modulation, pulse modulation, or the like.

Meanwhile, the optical unit 120 may include at least one lens. The optical unit 120 condenses an input light signal reflected from an object through at least one lens and transmits the condensed input light signal to the sensor 130. The at least one lens may include a solid lens. Also, the at least one lens may include a variable lens. The variable lens may be a varifocal lens. Also, the variable lens may be a lens whose focal point is adjustable. The variable lens may be at least one of a liquid lens, a polymer lens, a liquid crystal lens, a voice coil motor (VCM) lens, and a shape memory alloy (SMA) lens. The liquid lens may include a liquid lens including a single liquid and a liquid lens including two different liquids. The liquid lens including a single liquid may change a focal point by adjusting a membrane disposed at a position corresponding to the liquid, e.g., change the focal point by pressing the membrane by an electromagnetic force between a magnet and a coil. The liquid lens including two different liquids may include a conductive liquid and a non-conductive liquid and use a voltage applied to the liquid lens to adjust an interface formed by the conductive liquid and the non-conductive liquid. The polymer lens may include a polymer material and change a focal point by a driving unit such as a piezoelectric device. The liquid crystal lens may change a focal point by controlling liquid crystal by an electromagnetic force. The VCM lens may change a focal point by adjusting a solid lens or a lens assembly including a solid lens by an electromagnetic force between a magnet and a coil. The SMA lens may change a focal point by controlling a solid lens or a lens assembly including a solid lens using a SMA.

Also, the optical unit 120 may include a filter configured to pass light in a specific wavelength range. For example, the filter configured to pass light in a specific wavelength range may include an infrared (IR) pass filter. The filter may only pass light in an infrared range whose wavelength is in a range of 770 to 3,000 nm. The filter may be tilted by a driving device. An optical path of an input light signal may be changed according to the tilting of the filter. The filter may be tilted according to a predetermined rule, and an optical path of an input light signal may be changed according to the predetermined rule.

Also, the optical unit 120 may include an optical plate. The optical plate may be a light-passing plate.

Referring to FIG. 3, a camera device 300 may include a lens assembly 310, a sensor 320, and a printed circuit board 330. Here, the lens assembly 310 may correspond to the optical unit 120 of FIG. 1, and the sensor 320 may correspond to the sensor 130 of FIG. 1. Also, the control unit 150 of FIG. 1 may be implemented by the printed circuit board 330 or the sensor 320. Although not illustrated, the light output unit 110 of FIG. 1 may be disposed on the printed circuit board 330 or disposed as a separate configuration. The light output unit 110 may be controlled by the control unit 150.

The lens assembly 310 may include a lens 312, a lens barrel 314, a lens holder 316, and an IR filter 318.

The lens 312 may be provided as a plurality of lenses or a single lens. In a case in which the lens 312 is provided as a plurality of lenses, the lenses may be aligned with respect to a central axis and form an optical system. Here, the central axis may be the same as an optical axis. The lens 312 may include the above-described variable lens.

The lens barrel 314 may be coupled to the lens holder 316 and have a space provided therein to accommodate a lens. The lens barrel 314 may be rotatably coupled to a single lens or a plurality of lenses, but this is merely illustrative. The lens barrel 314 may be coupled using other methods, e.g., a method using an adhesive (for example, an adhesive resin such as epoxy resin).

The lens holder 316 may be coupled to the lens barrel 314 and support the lens barrel 314 and be disposed on the printed circuit board 330 on which the sensor 320 is mounted. A space in which the IR filter 318 may be disposed may be formed in the lens barrel 314 by the lens holder 316. Although not illustrated, a driving unit that is controlled by the control unit 150 and capable of tilting or shifting the IR barrel 314 may be disposed in the lens barrel 314. A helical pattern may be formed on an inner circumferential surface of the lens holder 316, and the lens holder 316 may be rotatably coupled to the lens barrel 314 having a helical pattern formed on an outer circumferential surface thereof. However, this is merely illustrative, and the lens holder 316 and the lens barrel 314 may be coupled using an adhesive, or the lens holder 316 and the lens barrel 314 may be integrally formed.

The lens holder 316 may be divided into an upper holder 316-1 coupled to the lens barrel 314 and a lower holder 316-2 disposed on the printed circuit board 330 on which the sensor 320 is mounted. The upper holder 316-1 and the lower holder 316-2 may be integrally formed, formed of separate structures and then fastened or coupled to each other, or separated from each other and have structures which are spaced apart. Here, a diameter of the upper holder 316-1 may be formed smaller than a diameter of the lower holder 316-2.

The above example is merely an embodiment, and the optical unit 120 may be formed of any other structures capable of condensing an input light signal incident on the ToF camera module 100 and transmitting the condensed input light signal to the sensor 130.

The sensor 130 generates an electrical signal using the input light signal condensed by the optical unit 120. As an embodiment, the sensor 130 may absorb an input light signal in synchronization with an on-off period of the light output unit 110. Specifically, the sensor 130 may absorb light at an in-phase and an out-phase with an optical signal output from the light output unit 110.

The sensor 130 may generate an electrical signal corresponding to each reference signal using a plurality of reference signals having different phase differences. For example, the electrical signal may be a signal in which each reference signal is mixed with input light, and the mixing may include convolution, multiplication, and the like. Also, a frequency of the reference signal may be set to correspond to a frequency of an optical signal output from the light output unit 110. As an embodiment, a frequency of a reference signal may be the same as a frequency of an optical signal of the light output unit 110.

In this way, in a case in which the light output unit 110 generates an optical signal at a plurality of frequencies, the sensor 130 may generate an electrical signal using a plurality of reference signals corresponding to each frequency. Also, the electrical signal may include information on an amount of electric charge or a voltage corresponding to each reference signal. Also, the electrical signal may be computed for each pixel.

The control unit 150 may control the optical unit 120 to shift an optical path of an input light signal. By such a configuration, as will be described below, it is possible to output a plurality of pieces of image data for extracting a high-resolution depth image. This will be described in detail below. Also, here, a predetermined unit includes a first travel distance and a second travel distance, which will be described below. This will be described in detail below.

In addition, the camera module 100 may include an arithmetic unit 140 configured to use an electrical signal received from the sensor 130 and calculate depth information of higher resolution than a resolution of the sensor. Also, the arithmetic unit 140 may be disposed in an optical instrument including a camera module and perform an arithmetic operation. Hereinafter, description will be given assuming that the arithmetic unit 140 is disposed in the camera module.

Also, in this case, the arithmetic unit may receive information sensed by the sensor 130 from the camera module 100 and perform an arithmetic operation. The arithmetic unit 140 may receive a plurality of pieces of low-resolution information using an electrical signal received from the sensor 130 and generate high-resolution depth information using the plurality of pieces of low-resolution information. For example, the arithmetic unit 140 may rearrange the plurality of pieces of low-resolution information and generate high-resolution depth information.

Here, the arithmetic unit 140 may compute a distance between an object and the camera module 100 by using a time difference between an optical signal output from the light output unit and an optical signal received by the sensor or using a plurality of pieces of information acquired during a plurality of integration times of the sensor during which an effective area of the sensor is integrated at different phases.

FIG. 4 is a view for describing an electrical signal generation process according to an embodiment. Here, as described above, a phase of reflected light (input light) may be delayed as much as a distance in which incident light (output light) is incident on an object and then reflected back from the object.

Also, as described above, a reference signal may be provided as a plurality of reference signals. In an embodiment, there may be four reference signals ($C_1$ to $C_4$) as illustrated in FIG. 4. Also, the reference signals ($C_1$ to $C_4$) may each have the same frequency as the optical signal while having a 90° phase difference from each other. One of the four reference signals ($C_1$) may have the same phase as the optical signal.

The sensor 130 may integrate an effective area of the sensor 130 corresponding to each reference signal. The sensor 130 may receive an optical signal while performing the integration.

The sensor 130 may mix an input light signal with each reference signal. Then, the sensor 130 may generate an electrical signal corresponding to the shaded portion of FIG. 4.

As another embodiment, in a case in which an optical signal is generated at a plurality of frequencies during an integration time, the sensor 130 absorbs input light signals according to the plurality of frequencies. For example, assume that an optical signal is generated at frequencies $f_1$ and $f_2$ and a plurality of reference signals have a 90° phase difference. Then, because an incident light signal also has the frequencies $f_1$ and $f_2$, four electrical signals may be generated through an input light signal whose frequency is $f_1$ and four reference signals corresponding thereto. Also, four electrical signals may be generated through an input light signal whose frequency is $f_2$ and four reference signals corresponding thereto. Therefore, a total of eight electrical signals may be generated. Hereinafter, description will be given based on this, but as described above, the optical signal may be generated at a single frequency (for example, $f_1$).

FIG. 5 is a view for describing a sensor according to an embodiment, FIGS. 6 to 8 are views for describing a sensor according to a modified embodiment, FIG. 9 is a raw image relating to four phases that is obtained from a camera module according to an embodiment, FIG. 10 is an amplitude image obtained from a camera module according to an embodiment, and FIG. 11 is a depth image obtained from a camera module according to an embodiment.

Referring to FIGS. 5 to 8, a sensor 130 may be configured with a structure in which a plurality of pixels are arranged in the form of an array. Here, the sensor 130 is an active pixel sensor (APS) and may be a complementary metal oxide semiconductor (CMOS) sensor. Also, the sensor 130 may be a charge coupled device (CCD) sensor. Also, the sensor 130 may include a ToF sensor that receives infrared light reflected from a subject and measures a distance from the subject using a time difference or phase difference.

Also, the sensor 130 may include a plurality of pixels. Here, the pixels may include a first pixel P1 and a second pixel P2.

The first pixel P1 and the second pixel P2 may be alternately disposed in a first direction (x-axis direction) and a second direction (y-axis direction). That is, a plurality of second pixels P2 may be disposed adjacent to a single first pixel P1 in the first direction (x-axis direction) and the second direction (y-axis direction). For example, the first pixel P1 and the second pixel P2 may be disposed in a checkerboard pattern in the sensor 130. Also, here, the first direction (x-axis direction) is one direction in which, among the plurality of pixels arranged in the form of an array, the first pixel and the second pixel are arranged side by side, i.e., a row direction, and the second direction (y-axis direction) is a direction that is perpendicular to the first direction and in which the first pixel and the second pixel are arranged side by side, i.e., a column direction. Hereinafter, description will be given based on this. The terms "row direction" and "first direction" may be used alternatively, and the terms "column direction" and "second direction" may be used alternatively.

Also, the first pixel P1 and second pixel P2 may be pixels that receive lights whose peak wavelengths are in different wavelength bands. For example, the first pixel P1 may receive light having a peak wavelength in an infrared wavelength band. Also, the second pixel P2 may receive light having a peak wavelength in a wavelength band other than the infrared wavelength band.

Furthermore, any one of the first pixel P1 and the second pixel P2 may not receive light. As an embodiment, the plurality of pixels may include an effective area SA in which a light receiving element is disposed and an ineffective area IA which is an area other than the effective area. The effective area SA may receive light and generate a predetermined electrical signal. The ineffective area IA may be an area that does not receive light. The ineffective area IA may be an area that receives light and does not generate an electrical signal. That is, there may be a case in which the ineffective area IA is not able to generate an electrical signal by light even when a light receiving element is disposed in the ineffective area IA.

Also, the first pixel P1 may include the ineffective area IA as well as the effective area SA. On the other hand, the second pixel P2 may only be formed of the ineffective area IA without the effective area SA. For example, a light receiving element such as a photodiode may only be disposed in the first pixel and not disposed in the second pixel. Hereinafter, description will be given assuming that the second pixel does not receive light while the first pixel receives light.

Specifically, the sensor 130 may include a plurality of row regions RR that include the effective area SA and the ineffective area IA alternately disposed in the row direction. Also, in an embodiment, the sensor 130 may include a plurality of column regions CR that include the effective area SA and the ineffective area alternately disposed in the column direction.

In an embodiment, the sensor 130 may include a first row region RR1 and a second row region RR2. In the first row region RR1, the effective area SA and the ineffective area IA may be alternately disposed. In the second row region RR2, the effective area SA and the ineffective area IA may be alternately disposed in the row direction, and the effective area may be disposed at a position not overlapping the effective area of the first row region RR1 in the column direction.

By such a configuration, the sensor 130 may include the plurality of column regions CR. The plurality of column regions CR may include the effective area SA and the ineffective area IA alternately disposed in the column direction.

Also, the first pixel P1 and the second pixel P2 may be formed in various shapes such as a quadrangular shape, a triangular shape, a polygonal shape, and a circular shape. The effective area SA may also be formed in various shapes such as a quadrangular shape, a triangular shape, a polygonal shape, and a circular shape (see FIGS. 6 and 7).

Also, the second pixel P2 may include an element electrically connected to the first pixel P1 adjacent thereto. The element may be an electrical element such as a wire and a capacitor. The element may also be disposed on the first pixel or the second pixel (see FIG. 7).

Also, in an embodiment, each pixel may be an area formed by intervals between identical effective areas which are adjacent in a direction in which the pixels are arranged on the sensor (for example, the first direction or the second direction). Here, the identical effective areas refer to effective areas that have the same function (for example, receive light in the same wavelength band).

Also, the first pixel P1 may only have the effective area SA or have both the effective area SA and the ineffective area IA. Also, the effective area SA may be present at various positions in the first pixel P1. Thus, the center of the pixel and the center of the effective area may be different. However, the following description will be given assuming that the pixel and the effective area are concentric. Also, the terms "center," "first center" and the like used below refer to a pixel corresponding to the center.

Also, in a case of the sensor 130 with 320×240 resolution that is illustrated in FIG. 5, 76,800 pixels may be arranged in the form of a grid. Here, the plurality of pixels may be disposed to be spaced apart at predetermined intervals. That is, like the shaded portion of FIG. 5, a predetermined interval L may be formed between the plurality of pixels. A width dL of the interval L may be significantly smaller than the size of a pixel. Further, the above-mentioned wire and the like may be disposed at intervals L. In the following description, the interval L is ignored.

Also, as an embodiment, each pixel 132 (e.g., first pixel) may include a first light receiving unit 132-1, which includes a first photodiode and a first transistor, and a second light receiving unit 132-2, which includes a second photodiode and a second transistor.

The first light receiving unit 132-1 receives an input light signal at the same phase as a waveform of output light. That is, at a time at which a light source is turned on, the first photodiode is turned on and absorbs an input light signal. Also, at a time at which the light source is turned off, the first photodiode is turned off and stops absorbing the input light. The first photodiode converts the absorbed input light signal to current and transmits the current to the first transistor. The first transistor converts the received current to an electrical signal and outputs the electrical signal.

The second light receiving unit 132-2 receives an input light signal at the opposite phase from a waveform of output light. That is, at a time at which a light source is turned on, the second photodiode is turned off and absorbs an input light signal. Also, at a time at which the light source is turned off, the second photodiode is turned on and stops absorbing the input light. The second photodiode converts the absorbed input light signal to current and transmits the current to the second transistor. The second transistor converts the received current to an electrical signal.

Accordingly, the first light receiving unit 132-1 may be referred to as an in-phase reception unit, and the second light receiving unit 132-2 may be referred to as an out-phase reception unit. In this way, when the first light receiving unit 132-1 and the second light receiving unit 132-2 are activated with a time difference, an amount of light received varies according to a distance from an object. For example, in a case in which an object is right in front of a camera module 100 (that is, distance=0), because time taken for light to be reflected back from the object after being output from a light output unit 110 is 0, the on-off period of the light source corresponds exactly to a light reception period. Accordingly, only the first light receiving unit 132-1 receives light, and the second light receiving unit 132-2 is unable to receive light. As another example, in a case in which an object is spaced a predetermined distance apart from the camera module 100, because certain time is taken for light to be reflected back from the object after being output from the light output unit 110, the on-off period of the light source differs from the light reception period. Accordingly, there is a difference between amounts of light received by the first light receiving unit 132-1 and the second light receiving unit 132-2. That is, a distance from the object may be computed using the difference between the amounts of light input to the first light receiving unit 132-1 and the second light receiving unit 132-2. In other words, the control unit 150 calculates a phase difference between the out light and input light using an electrical signal received from the sensor 130 and calculates a distance between the object and the camera module 100 using the phase difference.

More specifically, the control unit 150 may calculate the phase difference between the output light and input light using information on an amount of electric charge of the electrical signal.

As described above, four electrical signals may be generated at each frequency of an optical signal. Therefore, the control unit 150 may calculate a phase difference (td) between an optical signal and an input light signal using Equation 1 below.

$$t_d = \arctan\left(\frac{Q_3 - Q_4}{Q_1 - Q_2}\right) \quad \text{[Equation 1]}$$

Here, $Q_1$ to $Q_4$ represent amounts of electric charge of four electrical signals. $Q_1$ represents an amount of electric charge of an electrical signal corresponding to a reference signal whose phase is the same as an optical signal. $Q_2$ represents an amount of electric charge of an electrical signal corresponding to a reference signal whose phase is 180° slower than the optical signal. $Q_3$ represents an amount of electric charge of an electrical signal corresponding to a reference signal whose phase is 90° slower than the optical signal. $Q_4$ represents an amount of electric charge of an electrical signal corresponding to a reference signal whose phase is 270° slower than the optical signal.

Also, the control unit 150 may calculate the distance between the object and the camera module 100 using a phase difference between the optical signal and the input light signal. Here, the control unit 150 may calculate a distance (d) between the object and the camera module 100 using Equation 2 below.

$$d = \frac{c}{2f} \frac{t_d}{2\pi} \qquad \text{[Equation 2]}$$

Here, c represents a speed of light, and f represents a frequency of output light.

According to an embodiment of the present invention, a ToF IR image and a depth image may be obtained from the camera module 100. Accordingly, the camera module according to an embodiment of the present invention may also be referred to as a ToF camera module or a ToF camera module.

In more detail in relation to this, as illustrated in FIG. 9, a raw image relating to four phases may be obtained from the camera module 100 according to an embodiment of the present invention. Here, the four phases may be 0°, 90°, 180°, and 270°. The raw image relating to each phase may be an image formed of pixel values digitalized for each phase. The terms "raw image," "phase image," "phase IR image," and the like may be used alternatively.

Referring to FIGS. 9 and 10, when an arithmetic operation is performed as in Equation 3 below using four phase images $Raw(x_0)$, $Raw(x_{90})$, $Raw(x_{180})$, and $Raw(x_{270})$ (see FIG. 9), an amplitude image (see FIG. 10), which is a ToF IR image, may be obtained.

$$\text{Amplitude} = \frac{1}{2}\sqrt{(Raw(x_{90}) - Raw(x_{270}))^2 + (Raw(x_{180}) - Raw(x_0))^2} \qquad \text{[Equation 3]}$$

Here, $Raw(x_0)$ may be data values for each pixel that the sensor receives at phase 0°, $Raw(x_{90})$ may be data values for each pixel that the sensor receives at phase 90°, $Raw(x_{180})$ may be data values for each pixel that the sensor receives at phase 180°, and $Raw(x_{270})$ may be data values for each pixel that the sensor receives at phase 270°.

Alternatively, when an arithmetic operation is performed as in Equation 4 below using the four phase images of FIG. 9, an intensity image, which is another ToF IR image, may be obtained.

$$\text{Intensity} = |[Raw(x_{90}) - Raw(x_{270})] + [Raw(x_{180}) - Raw(x_0)]| \qquad \text{[Equation 4]}$$

Here, $Raw(x_0)$ may be data values for each pixel that the sensor receives at phase 0°, $Raw(x_{90})$ may be data values for each pixel that the sensor receives at phase 90°, $Raw(x_{180})$ may be data values for each pixel that the sensor receives at phase 180°, and $Raw(x_{270})$ may be data values for each pixel that the sensor receives at phase 270°.

In this way, the ToF IR image may be generated through a process in which two of the four phase images subtract the other two phase images. For example, a 180° phase difference may be present between each pair of two phase images between which subtraction occurs. Also, background light may be removed in the process in which the two of the four phase images subtract the other two phase images. Accordingly, only the signals in a wavelength band output by a light source remain such that the IR sensitivity may increase and noise may significantly decrease with respect to the object.

In the present specification, the ToF IR image may refer to am amplitude image or an intensity image. The term "intensity image" may be used alternately with the term "confidence image." As illustrated in FIG. 10, the ToF IR image may be a grey image.

Meanwhile, when an arithmetic operation is performed as in Equation 5 and Equation 6 below using the four phase images of FIG. 9, a depth image shown in FIG. 11 may also be obtained.

$$\text{Phase} = \arctan\left(\frac{Raw(x_{90}) - Raw(x_{270})}{Raw(x_{180}) - Raw(x_0)}\right) \qquad \text{[Equation 5]}$$

$$\text{Depth} = \frac{1}{2f}c\frac{\text{Phase}}{2\pi} \quad (c = \text{speed of light}) \qquad \text{[Equation 6]}$$

Meanwhile, in an embodiment of the present invention, a super resolution (SR) technique is used in order to increase the resolution of the depth image. The SR technique is a technique for obtaining a high-resolution image from a plurality of low-resolution images. A mathematical model of the SR technique may be shown as Equation 7 below.

$$y_k = D_k B_k M_k x + n_k \qquad \text{[Equation 7]}$$

Here, $1 \le k \le p$ represents the number of low-resolution images, $y_k$ represents a low-resolution image ($=[y_{k,1}, y_{k,2}, \ldots, y_{k,M}]^T$, where $M = N_1 * N_2$), $D_k$ represents a down sampling matrix, $B_k$ represents a blur matrix, $M_k$ represents an image warping matrix, x represents a high-resolution image ($=[x_1, x_2, \ldots, x_N]^T$, where, $N = L_1 N_1 * L_2 N_2$), and $n_k$ represents noise. That is, the SR technique refers to a technology for estimating x by applying the inverse function of resolution deterioration factors estimated in $y_k$. The SR technique may be mainly classified into a statistical method and a multi-frame method, and the multi-frame method may be mainly classified into a space-division method and a time-division method. In a case in which the SR technique is used in order to acquire a depth image, because an inverse function of $M_k$ of Equation 1 does not exist, the statistical method may be tried. However, in the case of the statistical method, because a repeated computation process is required, there is a problem of low efficiency.

In order to apply the SR technique to depth information extraction, the control unit 150 may generate a plurality of low-resolution sub-frames using an electrical signal received from the sensor 130 and then extract a plurality of low-resolution images and a plurality of pieces of low-resolution depth information using the plurality of low-resolution sub-frames. Also, the control unit 150 may rearrange pixel values of the plurality of pieces of low-resolution depth information and extract high-resolution depth information. In the present specification, "high resolution" is a relative term that indicates resolution higher than low resolution.

Also, here, "sub-frame" may refer to image data generated from an electrical signal corresponding to any one integration time and any one reference signal. For example, in a case in which an electrical signal is generated through eight reference signals in a single integration time, i.e., a single image frame, eight sub-frames may be generated, and a single start-of-frame may be further generated. In the present specification, the term "sub-frame" may be used alternatively with the terms, "image data," "sub-frame image data," and the like.

Alternatively, in order to apply the SR technique according to an embodiment of the present invention to depth information extraction, the arithmetic unit 140 may generate a plurality of low-resolution sub-frames and a plurality of low-resolution images including the plurality of low-resolution sub-frames using an electrical signal received from the sensor 130 and then rearrange pixel values of the plurality of low-resolution sub-frames to generate a plurality of high-resolution sub-frames. Also, the arithmetic unit 140 may extract high-resolution depth information using the high-resolution sub-frames. High-resolution depth information may be extracted using the above-described method, and the method may identically apply to embodiments described below and modified examples thereof.

Also, for the extraction of the high-resolution depth information, a pixel shift technology may be used. That is, several sub-frames which are shifted by a predetermined travel distance may be acquired for each sub-frame using the pixel shift technology, a plurality of high-resolution sub-frames may be acquired by applying the SR technique for each sub-frame, and then depth information may be extracted for each sub-frame using the several shifted sub-frames and the plurality of high-resolution sub-frames, thereby extracting a high-resolution depth image. Also, for the pixel shift, the camera module may control the optical unit by the control unit.

The control unit 150 controls the optical unit 120 to shift an input light signal by a predetermined travel distance on the sensor 130. The control unit 150 may control the variable lens of the optical unit 120 to shift the input light signal by a predetermined travel distance on the sensor 130. Also, the control unit 150 may control the filter of the optical unit 120 to shift the input light signal by a predetermined travel distance on the sensor 130. For example, the control unit 150 may tilt the filter of the optical unit 120 to shift the input light signal on the sensor 130. Although not illustrated, the camera module 100 may include a driving unit for tilting the filter. The driving unit may drive the filter using a driving force of a VCM type, a piezo type, and the like.

The control unit 150 may control the optical unit to change an optical path of an input light signal by one pixel unit with respect to the sensor 130.

Meanwhile, in a case in which the camera module 100 according to an embodiment of the present invention is applied to an application that requires shooting a high-quality image, e.g., applied to an application that requires a precise image for biometric authentication or the like or applied to an application that requires a user to only use one hand in manipulating the camera module 100 and shooting an image, a technology for preventing or correcting image blurring due to hand shake is also required. The technology for preventing or correcting image blurring may be referred to as an optical image stabilizer (OIS) technique. With the OIS technique, image blurring may be prevented or corrected using a method of moving a structure, e.g., a lens or the like, in the camera module 100 in the X-axis and Y-axis directions perpendicular to an optical axis when the optical axis is the Z-axis.

Also, for the camera module 100 to have the SR function and the OIS function, the camera module 100 according to an embodiment of the present invention may further include a driving unit configured to move a structure inside the camera module 100.

FIG. 12 is a view for describing changing an optical path of an input light signal by a control unit of a camera module according to an embodiment.

More specifically, as described above, the control unit 150 may change an optical path of input light. A portion indicated by a solid line below represents an optical path of an input light signal during a first time, and a portion indicated by a dotted line represents a changed optical path of the input light signal during a second time. When an integration time corresponding to the optical path during the first time ends, the control unit 150 may change the optical path of the input light signal as indicated by the dotted line. Here, the first time is a predetermined time, and the second time is a time subsequent to the first time.

Then, the path of the input light signal may be shifted by the first travel distance from the optical path during the first time. Here, the plurality of integration times may include a first integration time and a second integration time that is subsequent to the first integration time. Also, the plurality of integration times may further include a third integration time subsequent to the second integration time and a fourth integration time subsequent to the third integration time. This will be described in detail below. Also, the first integration time is an integration time corresponding to the above-described optical path during the first time, and the second integration time is an integration time corresponding to an optical path during the second time after the first integration time. Also, in the second integration time, the optical path of the input light signal may be shifted by the first travel distance in a first travel direction so that the first pixel at least partially overlaps the second pixel adjacent to the first pixel. Here, the first travel distance is a travel distance of a pixel according to the shift with respect to the first integration time. For example, the first travel distance may be a first pixel. Also, the first travel direction may be any one of the first direction and the second direction. For example, as illustrated in FIG. 12, when the control unit 150 tilts the optical unit 120 rightward by a first angle $\theta_a$ during the first time, the input light signal incident on the sensor 130 may shift rightward by 1 pixel. That is, there is a position difference between an area I1 of an input light incident on the sensor 130 during the first time (hereinafter referred to as "first input area I1") and an area I2 of a changed input light signal incident on the sensor 130 during the first time (hereinafter referred to as "second input area I2"). Also, in the present specification, in imaging, generation of an input light signal and a changed input light signal during the first time may be affected by a micro integration time and performed within a short time. In other words, because the first input area and the second input area may almost be the same, accuracy of a finally output image may be improved.

Also, when matching the first input area and the second input area by changing the optical path as described above, the first pixel may shift by the first travel distance. That is, a pixel corresponding to the first pixel in the first input area may be shifted by the first travel distance as compared to a pixel corresponding to the first pixel in the second input area. In other words, the control unit may perform first shifting control so that light, which reaches an effective area of the first row region RR1, reaches an ineffective area of the first row region RR1 or an ineffective area of the second row region RR2. That is, by the first shifting control, the light reaching the effective area of the first row region RR1 may reach the ineffective area of the first row region RR1 or the ineffective area of the second row region RR2.

Also, by the first shifting control, light that reaches the effective area of the second row region RR2 may reach the ineffective area of the second row region RR2 or the ineffective area of the first row region RR1. Such shifting control may identically apply to various embodiments described below.

That is, as illustrated in FIG. 12, a center CP1 of the first pixel in the first input area I1 (hereinafter referred to as "first center") and a center CP2 of the first pixel in the second input area I2 (hereinafter referred to as "second center") may be disposed alternately in the first direction or the second direction. Also, the center CP2 of the first pixel in the second input area I2 may correspond to the center of a second pixel in the first input area I1. Also, the input image may correspond to a low-resolution image or correspond to a plurality of low-resolution sub-frame images. Also, one pixel may refer to 0.3 to 0.7 times a distance between centers of adjacent first pixels. In other words, one pixel may be 0.3 to 0.7 times a distance between centers of adjacent effective areas in the same row region. Hereinafter, description will be given assuming that one pixel is 0.5 times a distance between the centers of adjacent first pixels. Also, the above-mentioned first angle $\theta_a$ may be changed in various ways according to, for example, the shape of a lens in the optical unit.

Also, the shift of the optical path may identically apply even when shifting an optical path of an optical signal, and detailed description thereof will be omitted.

FIGS. 13A and 13B are views for describing driving for obtaining a high-resolution image by a camera module according to an embodiment, FIG. 13C is a view for describing a pixel value arrangement process of a camera module according to an embodiment, and FIGS. 13D and 13E are views for describing an effect in which an image frame input to a sensor is shifted according to IR filter slope control.

Referring to FIGS. 13A and 13B, an arithmetic unit may extract a plurality of pieces of low-resolution depth information using a plurality of low-resolution sub-frames and a plurality of low-resolution images which are generated in the same integration time, i.e., the same frame. Also, the arithmetic unit may rearrange pixel values of the plurality of pieces of low-resolution depth information and extract high-resolution depth information. Here, as described above, optical paths of input light signals corresponding to the plurality of pieces of low-resolution depth information may be different from each other.

Also, for example, the arithmetic unit may generate low-resolution sub-frames 1-1 to 2-8 using a plurality of electrical signals. The low-resolution sub-frames 1-1 to 1-8 are low-resolution sub-frames generated in a first integration time. That is, the low-resolution sub-frames 1-1 to 1-8 are frames generated by an electrical signal in the first input area. The low-resolution sub-frames 2-1 to 2-8 are low-resolution sub-frames generated in a second integration time. Likewise, the low-resolution sub-frames 2-1 to 2-8 are frames generated by an electrical signal in the second input area.

Then, the arithmetic unit may apply a depth information extraction technique to the plurality of low-resolution sub-frames generated in each integration time and extract pieces of low-resolution depth information LRD-1 and LRD-2. Also, the arithmetic unit rearranges pixels of the pieces of low-resolution depth information LRD-1 and LRD-2 and extracts high-resolution depth information HRD (see FIG. 13A).

Alternatively, as described above, the arithmetic unit may rearrange pixel values of a plurality of sub-frames corresponding to the same reference signal and generate high-resolution sub-frames. Here, the plurality of sub-frames each correspond to a different optical path of an optical signal or an input light signal. Also, the arithmetic unit may extract high-resolution depth information using the plurality of high-resolution sub-frames (see FIG. 13B).

For example, the low-resolution sub-frames 1-1 and 2-1 correspond to the same reference signal $C_1$ but correspond to different optical paths. Then, the arithmetic unit may rearrange pixel values of the low-resolution sub-frames 1-1 and 2-1 and generate a high-resolution sub-frame H-1. When high-resolution sub-frames H-1 to H-8 are generated by rearranging the pixel values, the arithmetic unit may apply the depth information extraction technique to the high-resolution sub-frames H-1 to H-8 and extract the high-resolution depth information HRD.

Referring to FIG. 13C, a camera module according to a first embodiment may generate an image whose resolution is increased by a factor of two by one-pixel shift. As an example, a single 4×4 high-resolution image may be generated using two 4×4 low-resolution images. However, the number of pixels is not limited thereto and may be changed to various values.

Specifically, as described above, a first low-resolution image and a second low-resolution image are images captured by shifting an optical path by the size of one pixel. The first low-resolution image may correspond to the first input area, and the second low-resolution image may correspond to the second input area. That is, a first image pixel of the first low-resolution image corresponds to the first pixel of the first input area, and a second image pixel of the second low-resolution image corresponds to the first pixel of the second input area. The arithmetic unit arranges pixel values of the second low-resolution image to correspond to a high-resolution image in a direction in which an optical path has shifted with respect to the first low-resolution image in which an optical path has not shifted. Here, the low-resolution image may have a meaning that encompasses a low-resolution sub-frame and low-resolution depth information, and the high-resolution image may have a meaning that encompasses a high-resolution sub-frame and high-resolution depth information. Also, because, as described above, only the first pixel performs light reception in the sensor, only the portions corresponding to the first pixels in the low-resolution image are indicated as pixels A, B, C, D, E, F, G, H, and the like.

Specifically, the second low-resolution image is an image that results from shifting rightward by 1 pixel from the first low-resolution image. Therefore, pixel B of the second low-resolution image is arranged in a pixel disposed at the right side of pixel A of the first low-resolution image. For example, the second pixel of the first low-resolution image may be disposed to correspond to the first pixel of the second low-resolution image, and the first pixel of the first low-resolution image may be disposed to correspond to the second pixel of the second low-resolution image.

Also, when all the pixel values of the first low-resolution image and the second low-resolution image are rearranged, a high-resolution image frame whose resolution is increased by a factor of two as compared with that of the low-resolution images is generated. In other words, the camera module according to the first embodiment may improve the resolution. Further, the camera module according to the first embodiment may improve a processing speed because generation and processing of electrical signals by the sensor are reduced in the in case in which only the first pixel receives light in the sensor.

Also, the control unit 150 may apply a weighted value to the arranged pixel values. Here, the weighted value may be set differently according to the size of sub-pixels or a travel direction of an optical path or may be set differently for each low-resolution image.

According to an embodiment, the control unit 150 may shift an input light signal by a method of controlling a slope of a lens assembly, e.g., an IR filter 318 (see FIG. 3) included in the lens assembly. Accordingly, the control unit 150 may obtain data that is shifted by 1 pixel.

Referring to FIGS. 13D and 13E, FIG. 13E shows a result of simulating a shift distance with respect to a tilting angle under conditions in which a thickness of the IR filter is 0.21 mm and a refractive index of the IR filter is 1.5.

Referring to FIG. 13D and Equation 8 below, a slope $\theta_1$ of the IR filter 318 and the shift distance may have the following relation.

$$\Delta x = d\cos\theta_1 \left( \frac{1}{\tan(90° - \theta_1)} - \frac{1}{\tan(90° - \theta_2)} \right) \quad \text{[Equation 8]}$$

Here, $\theta_2$ may be shown as Equation 9 below.

$$\theta_2 = \sin^{-1}\left( \frac{\sin\theta_1}{n_g} \right) \quad \text{[Equation 9]}$$

Also, $\theta_1$ represents the slope, i.e., the tilting angle, of the IR filter 318, $n_g$ represents a refractive index of the IR filter 318, and d represents a thickness of the IR filter 318. For example, referring to Equations 8 and 9, in order to shift an image frame input to the sensor by 7 μm, the IR filter 318 may be tilted by about 5 to 6°. Here, a vertical displacement of the IR filter 318 may be about 175 to 210 μm.

In this way, when the slope of the IR filter 318 is controlled, it is possible to obtain shifted image data without tilting the sensor 320 itself.

According to an embodiment of the present invention, a control unit for controlling a slope of an IR filter may include an actuator that is directly or indirectly connected to the IR filter, and the actuator may include at least one of microelectromechanical system (MEMS), a voice coil motor (VCM), and a piezoelectric element.

Here, as described above, the size of one pixel may be 0.5 times the distance between the centers of adjacent first pixels. Also, very precise control is required to shift an input light signal by 1 pixel. In a case in which the IR filter is tilted using the actuator, the slope of the tilted IR filter and a shift value of the input light signal may become different from predetermined values according to the degree of precision of the actuator. Particularly, in a case in which an error or a failure occurs during operation of the actuator or parts of the actuator are misaligned due to being used for a long period of time, an error of the slope of the IR filter and the shift value of the input light signal may become very large.

Thus, in an embodiment, an optical path of input light may be shifted in sub-pixel units using the control unit, and an actual shift value may be detected to compensate for an error at the time of image processing according to the SR technique.

According to an embodiment, the control unit 150 may change an optical path of an input light signal in terms of software or hardware. Although shifting the optical path of the input light signal by the control unit 150 using the method of controlling the slope of the IR filter has been described above as an example, the present invention is not limited thereto, and the control unit 150 may also shift the optical path of the input light signal using the variable lens of the optical unit.

Also, the control unit 150 may shift the optical path of the input light signal by repeating the optical path according to a predetermined rule for each integration time. For example, the control unit 150 may shift the optical path of the input light signal by 1 pixel unit of the sensor 130 in the first travel direction in the second integration time which is subsequent to the first integration time. Alternatively, as described below, the control unit 150 may shift the optical path of the input light signal by 0.5 pixel unit of the sensor 130 in a second travel direction and the first travel direction in the third integration time which is subsequent to the second integration time. Also, the control unit 150 may shift the optical path of the input light signal by one pixel unit of the sensor 130 in a third travel direction after the third integration time.

Furthermore, the control unit 150 may control the optical unit 120 to control an optical path of an input light signal. The control unit 150 may control light received by the effective area of the first row region RR1 to reach the ineffective area of the first row region RR1. Also, the control unit 150 may perform shifting control so that light received by an effective area of the second row region RR2 reaches the ineffective area of the second row region RR2.

Also, as described above, the optical unit 120 may include an IR pass filter as a filter, and the control unit 150 may perform shifting control on an optical path by tilting the IR pass filter.

The above-described control may identically apply to various embodiments described below.

Also, in an embodiment, the control unit 150 may use the SR technique and register a first low-resolution image obtained from data extracted during the first integration time and a second low-resolution image obtained by data extracted during the second integration time by shifting by 1 pixel in the first travel direction, thereby obtaining a single piece of depth information. That is, a high-resolution image having depth information may be generated by registering a plurality of low-resolution images using the SR technique. Here, the terms "first low-resolution image" and "second low-resolution image" may be used alternatively with the above-mentioned "low-resolution sub-frame," "low-resolution image," and the like.

Also, the camera module 100 according to an embodiment may detect a shift value of an optical path of input light and control the control unit 150 or the arithmetic unit using the detected shift value or reflect the detected shift value to generation of a depth image.

FIG. 14 and FIGS. 15A to 15C are views for describing driving for obtaining a high-resolution image by a camera module according to an embodiment.

Referring to FIG. 14 and FIGS. 15A to 15C, in a camera module according to a second embodiment, a high-resolution image may be formed by an arithmetic unit as in the above description, and the arithmetic unit may extract a plurality of pieces of low-resolution depth information using a plurality of low-resolution sub-frames generated in the same integration time, i.e., the same frame. Also, the arithmetic unit may rearrange pixel values of the plurality of pieces of low-resolution depth information and extract high-resolution depth information. Also, in the second embodiment, as described above, the plurality of pieces of low-resolution depth information may each correspond to a different optical path of an optical signal or an input light signal.

Specifically, the arithmetic unit may generate low-resolution sub-frames 1-1 to 3-8 using a plurality of electrical signals. The low-resolution sub-frames 1-1 to 1-8 are low-resolution sub-frames generated in a first integration time. The low-resolution sub-frames 2-1 to 2-8 are low-resolution sub-frames generated in a second integration time. The above-given descriptions may identically apply to the low-resolution sub-frames 1-1 to 1-8 and the low-resolution sub-frames 2-1 to 2-8. Likewise, the above-given descriptions may identically apply to changing an optical path by a tilting unit.

However, the low-resolution sub-frames 3-1 to 3-8 may be low-resolution sub-frames which are generated on the basis of electrical signals generated by the control unit changing the optical path of input light.

Specifically, as described above, the control unit may change the optical path of input light. The control unit may shift the optical path by the first travel distance in the second integration time and then shift the optical path by the second travel distance in each of the second travel direction and the third travel direction in the third integration time. Here, the second travel distance may be 0.5 to 1 times the first travel distance. Hereinafter, description will be given assuming that the second travel distance corresponds to 0.5 pixel. Here, the second travel direction is a direction perpendicular to the first travel direction, and the third travel direction is a direction identical to the first travel direction. Thus, when the first travel direction is the first direction, the second travel direction may be the second direction, and when the first travel direction is the second direction, the second travel direction may be the first direction.

For example, when the control unit shifts the optical path downward and leftward by a second angle $\theta_b$, an input light signal incident on the sensor 130 may be shifted by 0.5 pixel both downward and leftward. Here, the above-mentioned second angle $\theta_b$ may be changed in various ways according to, for example, the shape of a lens in the optical unit, the shape of a filter, and the like.

Also, by such shift, there is a position difference between the first input area I1, the second input area I2, and a third input area I3 which are incident on the sensor 130.

In other words, a center CP3 of the third input area I3 (hereinafter referred to as "third center") may be disposed between the first center CP1 of the first input area I1 and the second center CP2 of the second input area I2. Also, in the third input area I3, the third center may be disposed within one pixel from the first center adjacent thereto and the second center adjacent thereto. Also, the third center may be disposed at a point of intersection between a first virtual line between the most adjacent first centers and a second virtual line between the most adjacent second centers. Also, like the first centers and the second centers, the third centers may be disposed to be spaced apart in the first direction and the second direction. Also, the third centers may be disposed to be spaced apart at the same length as a separation distance between the first centers in the first direction or the second direction.

That is, in an embodiment, the control unit may perform second shifting control in which light that reaches the ineffective area of the first row region RR1 is shifted toward the ineffective area of the second row region RR2 adjacent to the ineffective area of the first row region RR1. In this way, by the second shifting control, the light that reaches the ineffective area of the first row region RR1 may reach the ineffective area of the second row region RR2 adjacent to the ineffective area of the first row region RR1. Also, the light reaching the ineffective area of the first row region RR1 may be shifted toward the ineffective area of the second row region RR2 that is most adjacent to the ineffective area of the first row region RR1.

Also, the control unit may perform the second shifting control so that light that reaches the effective area of the first row region RR1 is shifted toward the effective area of the second row region RR2 adjacent to the effective area of the first row region RR1. In this way, by the second shifting control, the light that reaches the effective area of the first row region RR1 may reach the effective area of the second row region RR2 adjacent to the effective area of the first row region RR1. Also, the light reaching the effective area of the first row region RR1 may be shifted toward the effective area of the second row region RR2 that is most adjacent to the effective area of the first row region RR1. Such shifting control may identically apply to various embodiments described below.

Also, the second shifting control may be performed after the above-described first shifting control. Also, a travel distance of light that reaches the sensor by the first shifting control may be different from a travel distance of light that reaches the sensor by the second shifting control. For example, the travel distance of the light that reaches the sensor by the first shifting control may be greater than the travel distance of the light that reaches the sensor by the second shifting control. This will be described in detail below.

Also, the low-resolution sub-frames 3-1 to 3-8 are low-resolution sub-frames generated in the third integration time. Then, the arithmetic unit applies the depth information extraction technique to the plurality of low-resolution sub-frames generated in each integration time and extracts pieces of low-resolution depth information LRD-1 to LRD-3. Then, as in the above description, the arithmetic unit rearranges pixel values of the pieces of low-resolution depth information LRD-1 to LRD-3 and extracts the high-resolution depth information HRD.

Alternatively, as described above, the arithmetic unit may rearrange pixel values of a plurality of sub-frames corresponding to the same reference signal and generate high-resolution sub-frames. Here, the plurality of sub-frames each correspond to a different optical path of an input light signal. Also, the arithmetic unit may extract high-resolution depth information using the plurality of high-resolution sub-frames.

For example, in FIG. 14, the low-resolution sub-frames 1-1, 2-1, and 3-1 correspond to the same reference signal $C_1$ but correspond to different optical paths. Then, the arithmetic unit may rearrange pixel values of the low-resolution sub-frames 1-1, 2-1, and 3-1 and generate a high-resolution sub-frame H-1. When high-resolution sub-frames H-1 to H-8 are generated by rearranging the pixel values, the arithmetic unit may apply the depth information extraction technique to the high-resolution sub-frames H-1 to H-8 and extract the high-resolution depth information HRD.

More specifically, the above-described low-resolution sub-frames 1-1 to 1-8 and low-resolution sub-frames 2-1 to 2-8 may be generated by the same method as in the first embodiment. Thus, the description thereof will be omitted, and a method of generating the low-resolution sub-frames 3-1 to 3-8 as illustrated in FIGS. 15A to 15C will be described.

Here, it is assumed that a single 4×6 high-resolution image is generated using three 4×4 low-resolution images. Here, a high-resolution pixel grid has 4×6 pixels, which is the same as the pixels of the high-resolution image. However, the number of pixels is not limited thereto and may be changed to various values.

As described above, the arithmetic unit may generate a plurality of low-resolution images such as a first low-resolution image, a second low-resolution image, and a third low-resolution image. Also, the first low-resolution image and the second low-resolution image are images captured by shifting an optical path by the size of one pixel in the first travel direction and may be generated during the first integration time and include depth information of an object. Also, the second low-resolution image may be generated during the second integration time and include depth information of the object. The third low-resolution image may be generated during the third integration time and include depth information of the object. Also, as described above, the first low-resolution image may correspond to the first input area, the second low-resolution image may correspond to the second input area, and the third low-resolution image may correspond to the third input area. That is, a first image pixel of the first low-resolution image may correspond to the first pixel of the first input area, a second image pixel of the second low-resolution image may correspond to the first pixel of the second input area, and a third image pixel of the third low-resolution image may correspond to the first pixel of the third input area.

The arithmetic unit arranges pixel values of the second low-resolution image to correspond to a high-resolution image in a direction in which an optical path has shifted with respect to the first low-resolution image in which an optical path has not shifted. For example, pixel B of the second low-resolution image may be disposed at the right side of each pixel of the first low-resolution image. Here, the low-resolution image may have a meaning that encompasses a low-resolution sub-frame and low-resolution depth information, and the high-resolution image may have a meaning that encompasses a high-resolution sub-frame and high-resolution depth information. Also, the third low-resolution image may be disposed between pixel A of the first low-resolution image and pixel B of the second low-resolution image.

Specifically, the third low-resolution image is an image that results from shifting downward by 1 sub-pixel from the second low-resolution image in each of the second travel direction and the third travel direction. That is, the third low-resolution image may be an image that results from shifting by 0.5 pixel in the second travel direction from the second low-resolution image and further shifting by 0.5 pixel in the third travel direction. For example, the third low-resolution image may be an image that results from shifting downward by 0.5 pixel from the second low-resolution image and further shifting leftward by 0.5 pixel. That is, the third low-resolution image may be an image that is shifted by less than one pixel with respect to the second low-resolution image. Thus, the travel distance of light that reaches the sensor by the first shifting control may be different from the travel distance of light that reaches the sensor by the second shifting control, and the travel distance of the light that reaches the sensor by the first shifting control may be greater than the travel distance of light that reaches the sensor by the second shifting control. For example, with reference to the third low-resolution image, the third low-resolution image may be an image that is shifted by 0.5 pixel from the second low-resolution image, but the second low-resolution image may be an image that is shifted by 1 pixel from the first low-resolution image. Preferably, the travel distance of light on a plane of the sensor by the first shifting control may be 0.3 to 0.7 times a distance between centers of adjacent effective areas in the same row region.

Also, the travel distance of light on the plane of the sensor by the second shifting control may be 0.3 to 0.7 times a distance between a center of the effective area of the first row region and a center of the second row region that is adjacent to the effective area of the first row region. Also, the travel distance of light by the first shifting control may be 0.5 to 1 times the travel distance of light by the second shifting control.

Also, each pixel C of the third low-resolution image may be disposed at centers of each pixel A of the first low-resolution image and each pixel B of the second low-resolution image. More specifically, each pixel C of the third low-resolution image may partially overlap pixel A of the first low-resolution image adjacent thereto and pixel B of the second low-resolution image adjacent thereto. For example, each pixel C of the third low-resolution image may overlap half of each of pixel A of the first low-resolution image adjacent thereto and pixel B of the second low-resolution image adjacent thereto.

Also, a center CP3 of a pixel on the third low-resolution image (hereinafter referred to as "third center") may be disposed within 1 pixel from the first center adjacent thereto and the second center adjacent thereto. Also, the third center may be disposed at a point of intersection between a first virtual line between the most adjacent first centers and a second virtual line between the most adjacent second centers. Also, like the first centers and the second centers, the third centers may be disposed to be spaced apart in the first direction and the second direction. Also, the third centers may be disposed to be spaced apart at the same length as a separation distance between the first centers in the first direction or the second direction.

Also, when all the pixel values of the first to third low-resolution images are rearranged on the high-resolution pixel grid, a high-resolution image frame whose resolution is increased by a factor of three as compared with that of the low-resolution images may be generated.

Meanwhile, the arithmetic unit may apply a weighted value to the arranged pixel values. Here, the weighted value may be set differently according to the size of pixels or a travel direction of an optical path or may be set differently for each low-resolution image.

According to an embodiment, the control unit 150 may shift an input light signal by a method of controlling a slope of a lens assembly, e.g., the IR filter 318 (see FIG. 3) included in the lens assembly. Accordingly, the control unit 150 may obtain data that is shifted by 1 sub-pixel. The method of controlling the slope may be the same as that described above with reference to FIGS. 13D and 13E.

FIG. 16 and FIGS. 17A to 17C are views for describing driving for obtaining a high-resolution image by a camera module according to an embodiment. Referring to FIG. 16 and FIGS. 17A to 17C, the arithmetic unit may extract a plurality of pieces of low-resolution depth information using a plurality of low-resolution sub-frames generated in the same integration time, i.e., the same frame. Also, the arithmetic unit may rearrange pixel values of the plurality of pieces of low-resolution depth information and extract high-resolution depth information. Also, in a case in which the control unit is used, the plurality of pieces of low-resolution depth information may each correspond to a different optical path of an input light signal.

For example, the arithmetic unit may generate low-resolution sub-frames 1-1 to 4-8 using a plurality of electrical signals. The low-resolution sub-frames 1-1 to 1-8 are low-resolution sub-frames generated in a first integration time. The low-resolution sub-frames 2-1 to 2-8 are low-resolution sub-frames generated in a second integration time. The low-resolution sub-frames 3-1 to 3-8 are low-resolution sub-frames generated in a third integration time. The low-resolution sub-frames 4-1 to 4-8 are low-resolution sub-frames generated in a fourth integration time. Then, the arithmetic unit applies the depth information extraction technique to the plurality of low-resolution sub-frames generated in each integration time and extracts pieces of low-resolution depth information LRD-1 to LRD-4. The low-resolution depth information LRD-1 is low-resolution depth information extracted using the sub-frames 1-1 to 1-8. The low-resolution depth information LRD-2 is low-resolution depth information extracted using the sub-frames 2-1 to 2-8. The low-resolution depth information LRD-3 is low-resolution depth information extracted using the sub-frames 3-1 to 3-8. The low-resolution depth information LRD-4 is low-resolution depth information extracted using the sub-frames 4-1 to 4-8. Also, the arithmetic unit rearranges pixel values of the pieces of low-resolution depth information LRD-1 to LRD-4 and extracts the high-resolution depth information HRD.

Alternatively, as described above, the arithmetic unit may rearrange pixel values of a plurality of sub-frames corresponding to the same reference signal and generate high-resolution sub-frames. Here, the plurality of sub-frames each correspond to a different optical path of an input light signal. Also, the arithmetic unit may extract high-resolution depth information using the plurality of high-resolution sub-frames.

For example, as in FIG. 17A, the arithmetic unit generates the low-resolution sub-frames 1-1 to 4-8 using a plurality of electrical signals. The low-resolution sub-frames 1-1 to 1-8 are low-resolution sub-frames generated in a first integration time. The low-resolution sub-frames 2-1 to 2-8 are low-resolution sub-frames generated in a second integration time. The low-resolution sub-frames 3-1 to 3-8 are low-resolution sub-frames generated in a third integration time. The low-resolution sub-frames 4-1 to 4-8 are low-resolution sub-frames generated in a fourth integration time. Here, the low-resolution sub-frames 1-1, 2-1, 3-1, and 4-1 correspond to the same reference signal $C_1$ but correspond to different optical paths. Then, the arithmetic unit may rearrange pixel values of the low-resolution sub-frames 1-1, 2-1, 3-1, and 4-1 and generate a high-resolution sub-frame H-1. When high-resolution sub-frames H-1 to H-8 are generated in this way, the arithmetic unit may apply the depth information extraction technique to the high-resolution sub-frames H-1 to H-8 and extract the high-resolution depth information HRD.

More specifically, the above-described low-resolution sub-frames 1-1 to 1-8 and low-resolution sub-frames 2-1 to 2-8 may be generated by the same method as in the first embodiment and the second embodiment. Also, the low-resolution sub-frames 3-1 to 3-8 may be generated by the same method as in the second embodiment. Thus, the description thereof will be omitted, and a method of generating the low-resolution sub-frames 4-1 to 4-8 as illustrated in FIGS. 17A to 17C will be described.

Also, here, it is assumed that a single 4×8 high-resolution image is generated using four 4×4 low-resolution images. Here, a high-resolution pixel grid has 4×8 pixels, which is the same as the pixels of the high-resolution image. However, the number of pixels is not limited thereto. Also, the low-resolution image may have a meaning that encompasses a low-resolution sub-frame and low-resolution depth information, and the high-resolution image may have a meaning that encompasses a high-resolution sub-frame and high-resolution depth information.

As described above in the first embodiment and the second embodiment, the first to fourth low-resolution images are images captured by shifting an optical path by the control unit. That is, the control unit may shift the optical path by the first travel distance in the third travel direction with respect to the third integration time in the fourth integration time. Here, the fourth integration time is an integration time subsequent to the third integration time. Accordingly, as in the first embodiment or the second embodiment described above, the fourth low-resolution image may be generated by the arithmetic unit in the fourth integration time.

Also, the arithmetic unit rearranges pixel values of the second to fourth low-resolution images to correspond to a high-resolution image in a direction in which an optical path has shifted with respect to the first low-resolution image in which an optical path has not shifted. For example, the fourth low-resolution image may be generated by the control unit shifting an optical path of an input signal leftward by 1 pixel with respect to the sensor after the third integration time ends. Likewise, the third travel direction may be a direction opposite to the first travel direction, and, in a case in which the first travel direction is rightward, the third travel direction is leftward.

Therefore, in order to generate the fourth low-resolution image, a camera module according to a third embodiment may generate the fourth low-resolution image from a fourth input area 14 that is obtained by driving in the same way as the driving by the control unit in the first embodiment except for setting the direction to be opposite. Here, a center CP4 of the fourth input area 14 (hereinafter referred to as "fourth center") may be alternately disposed with the third center CP3 in the first direction and the second direction. Also, the fourth center CP4 may be disposed between the first center CP1 and the second center CP2. Also, like each pixel C of the third low-resolution image, each pixel D of the fourth low-resolution image may be disposed at the center of each pixel A of the first low-resolution image and the center of each pixel B of the second low-resolution image. Thus, each pixel D of the fourth low-resolution image may partially overlap pixel A of the first low-resolution image adjacent thereto and pixel B of the second low-resolution image adjacent thereto. For example, each pixel C of the third low-resolution image may overlap half of each of pixel A of the first low-resolution image adjacent thereto and pixel B of the second low-resolution image adjacent thereto.

Also, as described above, the first low-resolution image may correspond to the first input area, the second low-resolution image may correspond to the second input area, the third low-resolution image may correspond to the third input area, and the fourth low-resolution image may correspond to the fourth input area. That is, a first image pixel of the first low-resolution image may correspond to the first pixel of the first input area, a second image pixel of the second low-resolution image may correspond to the first pixel of the second input area, a third image pixel of the third low-resolution image may correspond to the first pixel of the third input area, and a fourth image pixel of the fourth low-resolution image may correspond to the first pixel of the fourth input area. Also, as described above, the first image pixel to the fourth image pixel may correspond to each low-resolution image or the first pixel of the first input image.

For example, pixel B of the second low-resolution image may be arranged in a pixel disposed at the right side of pixel A of the first low-resolution image, pixel C of the third low-resolution image may be arranged in a pixel disposed below each pixel B of the second low-resolution image, and pixel D of the fourth low-resolution image may be arranged in a pixel disposed at the left side of pixel C of the third low-resolution image. By such a configuration, the camera module according to the third embodiment may rearrange all the pixel values of the first to fourth low-resolution images on the high-resolution pixel grid and provide a high-resolution image frame whose resolution is increased by a factor of four as compared with that of the low-resolution images.

Further, the arithmetic unit may apply a weighted value to the arranged pixel values. Here, the weighted value may be set differently according to the size of sub-pixels or a travel direction of an optical path or may be set differently for each low-resolution image.

Also, according to an embodiment, the control unit 150 may shift an input light signal by a method of controlling a slope of a lens assembly, e.g., the IR filter 318 (see FIG. 3) included in the lens assembly. Accordingly, the control unit 150 may obtain data that is shifted by predetermined pixels. The method of controlling the slope may be the same as that described above with reference to FIGS. 13D and 13E.

Also, as a modified example, the arithmetic unit may generate the fourth low-resolution image by applying interpolation with respect to the first low-resolution image and the second low-resolution image. That is, the low-resolution sub-frames 4-1 to 4-8 may be generated using the low-resolution sub-frames 1-1 to 1-8 and the low-resolution sub-frames 2-1 to 2-8.

In other words, as a modified example, the fourth low-resolution sub-frames 4-1 to 4-8 may be generated without performing shifting by the control unit.

Specifically, to this end, the arithmetic unit may compute a pixel value relating to a pixel corresponding to the fourth center by using an interpolation technique with respect to pixels of the sub-frames 1-1 to 1-8 adjacent thereto and pixels of the sub-frames 2-1 to 2-8 adjacent thereto.

In an embodiment, linear interpolation, polynomial interpolation, spline interpolation, exponential interpolation, log linear interpolation, Lagrange interpolation, Newton interpolation, bilinear interpolation, geographic interpolation, and the like may be applied as the interpolation technique.

For example, the arithmetic unit may compute the pixel value corresponding to the fourth center by reflecting weighted values from pixel values corresponding to two first centers most adjacent to the fourth center and two second centers most adjacent to the fourth center. Here, because a distance from the fourth center is the same for the first center and the second center adjacent to the fourth center, the above-mentioned weighted values may be the same as each other. By such a method, a processing speed by the interpolation technique may be improved.

Also, in other words, the fourth low-resolution image may include a fourth image pixel, and the fourth image pixel may be disposed at a center of two first image pixels most adjacent thereto and two second image pixels most adjacent to the two first image pixels. That is, the fourth image pixel may be computed by applying interpolation with respect to the two first image pixels most adjacent thereto and the two second image pixels most adjacent to the two first image pixels. By such a method, the arithmetic unit may generate the low-resolution sub-frames 4-1 to 4-8 which are based on the pixel values corresponding to the fourth center obtained using the interpolation technique.

In other words, by applying interpolation between light that reaches the sensor by the first shifting control and light that reaches the sensor by the second shifting control, it is possible to compute light that reaches the center (the fourth image pixel) of most adjacent light that reaches the sensor by the first shifting control (corresponds to the two first image pixels most adjacent thereto) and light most adjacent to the most adjacent light reaching the sensor by the first shifting control (corresponds to the second image pixels). Such an interpolation technique may identically apply below.

Also, as described above, the camera module according to the third embodiment may rearrange all the pixel values of the first to fourth low-resolution images on the high-resolution pixel grid and provide a high-resolution image frame whose resolution is increased by a factor of four as compared with that of the low-resolution images.

Also, the fourth image pixel may not overlap the third image pixel. Accordingly, accuracy of pixel values may be improved.

FIG. 18 and FIGS. 19A to 19C are views for describing driving for obtaining a high-resolution image by a camera module according to an embodiment.

Referring to FIG. 18 and FIGS. 19A to 19C, the arithmetic unit may extract a plurality of pieces of low-resolution depth information using a plurality of low-resolution sub-frames generated in the same integration time, i.e., the same frame. Also, the arithmetic unit may generate a plurality of low-resolution sub-frames using the plurality of low-resolution sub-frames. In addition, the arithmetic unit may rearrange pixel values of the plurality of pieces of low-resolution depth information and extract high-resolution depth information. Also, in a case in which the control unit is used, the plurality of pieces of low-resolution depth information may each correspond to a different optical path of an input light signal.

For example, the arithmetic unit may generate low-resolution sub-frames 1-1 to 4-8 using a plurality of electrical signals. The low-resolution sub-frames 1-1 to 1-8 are low-resolution sub-frames generated in a first integration time. The low-resolution sub-frames 2-1 to 2-8 are low-resolution sub-frames generated in a second integration time. The low-resolution sub-frames 1-1 to 1-8 and the low-resolution sub-frames 2-1 to 2-8 may be the same as those described above in the first to third embodiments.

However, according to a fourth embodiment, the arithmetic unit may generate third low-resolution sub-frames 3-1 to 3-8 and fourth low-resolution sub-frames 4-1 to 4-8 using first low-resolution sub-frames 1-1 to 1-8 and second low-resolution sub-frames 2-1 to 2-8.

Specifically, the low-resolution sub-frames 3-1 to 3-8 may be generated using the low-resolution sub-frames 1-1 to 1-8 and the low-resolution sub-frames 2-1 to 2-8. In other words, the low-resolution sub-frames 3-1 to 3-8 may be generated without performing shifting by the control unit.

Also, the low-resolution sub-frames 4-1 to 4-8 may be generated using the low-resolution sub-frames 1-1 to 1-8 and the low-resolution sub-frames 2-1 to 2-8. In other words, the low-resolution sub-frames 4-1 to 4-8 may be generated without shifting by the control unit.

To this end, the arithmetic unit may compute a pixel value relating to a pixel corresponding to the third center by using an interpolation technique with respect to pixels of the sub-frames 1-1 to 1-8 adjacent thereto and pixels of the sub-frames 2-1 to 2-8 adjacent thereto.

Likewise, the arithmetic unit may compute a pixel value relating to a pixel corresponding to the fourth center by using the interpolation technique with respect to pixels of the sub-frames 1-1 to 1-8 adjacent thereto and pixels of the sub-frames 2-1 to 2-8 adjacent thereto. In other words, the fourth low-resolution image may include a fourth image pixel, and the fourth image pixel may be disposed at a center of two first image pixels most adjacent thereto and two second image pixels most adjacent to the two first image pixels.

As described above, linear interpolation, polynomial interpolation, spline interpolation, exponential interpolation, log linear interpolation, Lagrange interpolation, Newton interpolation, bilinear interpolation, geographic interpolation, and the like may be applied as the interpolation technique.

Also, the arithmetic unit may compute the pixel value corresponding to the third center by reflecting weighted values from pixel values corresponding to two first centers most adjacent to the third center and two second centers most adjacent to the third center. Here, because a distance from the third center is the same for the first center and the second center adjacent to the third center, the above-mentioned weighted values may be the same as each other. By such a method, a processing speed by the interpolation technique may be improved.

Likewise, the arithmetic unit may compute the pixel value corresponding to the fourth center by reflecting weighted values from pixel values corresponding to two first centers most adjacent to the fourth center and two second centers most adjacent to the fourth center. Also, because a distance from the fourth center is the same for the first center and the second center adjacent to the fourth center, the above-mentioned weighted values may be the same as each other.

Here, the third center may use some of the pixel values used to compute the pixel value of the fourth pixel adjacent to the third center. For example, in computing pixel values, the third center and the fourth center adjacent to each other may share at least one pixel value of the first center and at least one pixel value of the second center.

By such a method, the arithmetic unit may generate the low-resolution sub-frames 3-1 to 3-8 which are based on the pixel values corresponding to the third center obtained using the interpolation technique. Also, the arithmetic unit may generate the low-resolution sub-frames 4-1 to 4-8 which are based on the pixel values corresponding to the fourth center.

Accordingly, the camera module according to the fourth embodiment may rearrange all the pixel values of the first to fourth low-resolution images on the high-resolution pixel grid and provide a high-resolution image frame whose resolution is increased by a factor of four as compared with that of the low-resolution images.

Also, the arithmetic unit may apply the depth information extraction technique to the plurality of low-resolution sub-frames generated by the above-described method and extract pieces of low-resolution depth information LRD-1 to LRD-4. Also, the low-resolution depth information LRD-1 is low-resolution depth information extracted using the sub-frames 1-1 to 1-8. The low-resolution depth information LRD-2 is low-resolution depth information extracted using the sub-frames 2-1 to 2-8. The low-resolution depth information LRD-3 is low-resolution depth information extracted using the sub-frames 3-1 to 3-8. The low-resolution depth information LRD-4 is low-resolution depth information extracted using the sub-frames 4-1 to 4-8.

Also, the arithmetic unit rearranges pixel values of the pieces of low-resolution depth information LRD-1 to LRD-4 and extracts the high-resolution depth information HRD.

Also, the arithmetic unit may rearrange pixel values of the low-resolution sub-frames 1-1, 2-1, 3-1, and 4-1 and generate a high-resolution sub-frame H-1.

Alternatively, like the description given above in the third embodiment, the pixels of the low-resolution sub-frames may be rearranged. In other words, the arithmetic unit may generate the first to fourth low-resolution images.

Specifically, the arithmetic unit may generate the first low-resolution image, which is generated during the first integration time and includes depth information of the object, and the second low-resolution image, which is generated during the second integration time and includes depth information of the object. Also, the arithmetic unit may generate the third low-resolution image by applying interpolation with respect to the first low-resolution image and the second low-resolution image and generate the fourth low-resolution image by applying interpolation with respect to the first low-resolution image and the second low-resolution image.

Here, the first low-resolution image may include a first image pixel corresponding to the first pixel, and the second low-resolution image may include a second image pixel corresponding to the first pixel.

Also, in the present embodiment, the third low-resolution image and the fourth low-resolution image may include a third image pixel and a fourth image pixel, respectively, which are disposed at a center of two first image pixels most adjacent thereto and two second image pixels most adjacent to the two first image pixels. In addition, the third image pixel and the fourth image pixel are computed by applying interpolation with respect to the two first image pixels most adjacent thereto and the two second image pixels most adjacent to the two first image pixels, and the third image pixel and the fourth image pixel may be disposed alternately in the first direction and the second direction.

That is, pixel B of the second low-resolution image may be arranged in a pixel disposed at the right side of each pixel A of the first low-resolution image, pixel C of the third low-resolution image may be arranged in a pixel disposed below each pixel B of the second low-resolution image, and pixel D of the fourth low-resolution image may be arranged in a pixel disposed at the left side of pixel C of the third low-resolution image. Also, when high-resolution sub-frames H-1 to H-8 are generated by rearranging the pixel values, the arithmetic unit may apply the depth information extraction technique to the high-resolution sub-frames H-1 to H-8 and extract the high-resolution depth information HRD. By such a configuration, the camera module according to the fourth embodiment may rearrange all the pixel values of the first to fourth low-resolution images on the high-resolution pixel grid and provide a high-resolution image frame whose resolution is increased by a factor of four as compared with that of the low-resolution images.

Also, here, it is assumed that a single 4×8 high-resolution image is generated using four 4×4 low-resolution images. Here, a high-resolution pixel grid has 4×8 pixels, which is the same as the pixels of the high-resolution image. However, the number of pixels is not limited thereto. Also, the low-resolution image may have a meaning that encompasses a low-resolution sub-frame and low-resolution depth information, and the high-resolution image may have a meaning that encompasses a high-resolution sub-frame and high-resolution depth information.

In addition, as described above, the control unit 150 may shift an input light signal by a method of controlling a slope of a lens assembly, e.g., the IR filter 318 (see FIG. 3) included in the lens assembly. Accordingly, the control unit 150 may obtain data that is shifted by predetermined pixels. The method of controlling the slope may be the same as that described above with reference to FIGS. 13D and 13E.

FIG. 20 and FIGS. 21A to 21C are views for describing driving for obtaining a high-resolution image by a camera module according to an embodiment. Referring to FIG. 20 and FIGS. 21A to 21C, the arithmetic unit may extract a plurality of pieces of low-resolution depth information using a plurality of low-resolution sub-frames generated in the same integration time, i.e., the same frame. Also, the arithmetic unit may generate a plurality of low-resolution sub-frames using the plurality of low-resolution sub-frames. In addition, the arithmetic unit may rearrange pixel values of the plurality of pieces of low-resolution depth information and extract high-resolution depth information. In a case in which the control unit is used, the plurality of pieces of low-resolution depth information may each correspond to a different optical path of an optical signal or an input light signal.

For example, the arithmetic unit may generate low-resolution sub-frames 1-1 to 4-8 using a plurality of electrical signals. The low-resolution sub-frames 1-1 to 1-8 are low-resolution sub-frames generated in a first integration time. The low-resolution sub-frames 2-1 to 2-8 are low-resolution sub-frames generated in a second integration time. The low-resolution sub-frames 1-1 to 1-8 and the low-resolution sub-frames 2-1 to 2-8 may be the same as those described above in the first to third embodiments.

Low-resolution sub-frames 3-1 to 3-8 and low-resolution sub-frames 4-1 to 4-8 may also be generated by any one of the above-described third embodiment or fourth embodiment.

Accordingly, the arithmetic unit applies the depth information extraction technique to the plurality of low-resolution sub-frames generated in each integration time and extracts pieces of low-resolution depth information LRD-1 to LRD-4. The low-resolution depth information LRD-1 is low-resolution depth information extracted using the sub-frames 1-1 to 1-8. The low-resolution depth information LRD-2 is low-resolution depth information extracted using the sub-frames 2-1 to 2-8. The low-resolution depth information LRD-3 is low-resolution depth information extracted using the sub-frames 3-1 to 3-8. The low-resolution depth information LRD-4 is low-resolution depth information extracted using the sub-frames 4-1 to 4-8.

Here, according to a fifth embodiment, the arithmetic unit may further generate low-resolution sub-frames 5-1 to 8-8. In other words, the arithmetic unit may compute a fifth low-resolution image to an eighth low-resolution image by applying interpolation with respect to the first low-resolution image to the fourth low-resolution image.

Specifically, the arithmetic unit may generate the sub-frames 5-1 to 5-8, the sub-frames 6-1 to 6-8, the sub-frames 7-1 to 7-8, and the sub-frames 8-1 to 8-8 by using the sub-frames 1-1 to 1-8, the sub-frames 2-1 to 2-8, the sub-frames 3-1 to 3-8, and the sub-frames 4-1 to 4-8. Here, the arithmetic unit may compute the sub-frames 5-1 to 5-8, the sub-frames 6-1 to 6-8, the sub-frames 7-1 to 7-8, and the sub-frames 8-1 to 8-8 by using the interpolation technique with respect to the low-resolution sub-frames 1-1 to 1-8, the sub-frames 2-1 to 2-8, the sub-frames 3-1 to 3-8, and the sub-frames 4-1 to 4-8 which are adjacent thereto. The interpolation technique may be the same as that described above in the fourth embodiment.

More specifically, the fifth low-resolution image to the eighth low-resolution image may include a fifth image pixel to an eighth image pixel, respectively. Here, the fifth image pixel to the eighth image pixel may be disposed at centers of the first image pixel, the second image pixel that is most adjacent to the first image pixel, the third image pixel that is most adjacent to the first image pixel and the second image pixel most adjacent to the first image pixel, and the fourth image pixel that is most adjacent to the first image pixel and the second image pixel most adjacent to the first image pixel. Here, the fifth image pixel and the sixth image pixel may be disposed alternately in the first direction and the second direction, and the seventh image pixel and the eighth image pixel may be disposed alternately in the first direction and the second direction.

In this way, pixel E of the sub-frames 5-1 to 5-8 and pixel F of the sub-frames 6-1 to 6-8 may be disposed parallel to pixel A of the sub-frames 1-1 to 1-8 and pixel B of the sub-frames 2-1 to 2-8 in the first direction. For example, pixel E of the sub-frames 5-1 to 5-8 and pixel F of the sub-frames 6-1 to 6-8 may be disposed on a virtual line connecting the sub-frames 1-1 to 1-8 and the sub-frames 2-1 to 2-8 in the first direction. Also, pixel E of the sub-frames 5-1 to 5-8 and pixel F of the sub-frames 6-1 to 6-8 may be alternately disposed repeatedly.

Also, pixel G of the sub-frames 7-1 to 7-8 and pixel H of the sub-frames 8-1 to 8-8 may be disposed parallel to pixel A of the sub-frames 1-1 to 1-8 and pixel B of the sub-frames 2-1 to 2-8 in the second direction. For example, pixel G of the sub-frames 7-1 to 7-8 and pixel H of the sub-frames 8-1 to 8-8 may be disposed on a virtual line connecting the sub-frames 1-1 to 1-8 and the sub-frames 2-1 to 2-8 in the second direction. Also, pixel G of the sub-frames 7-1 to 7-8 and pixel H of the sub-frames 8-1 to 8-8 may be alternately disposed repeatedly.

Also, the arithmetic unit may rearrange pixel values of the pieces of low-resolution depth information LRD-1 to LRD-8 and extract high-resolution depth information HRD.

For example, the arithmetic unit may rearrange pixel values of the low-resolution sub-frames 1-1, 2-1, 3-1, 4-1, 5-1, 6-1, 7-1, and 8-1 and generate a high-resolution sub-frame H-1. On the basis of the above descriptions, the arithmetic unit may arrange pixel E of the fifth low-resolution image at the right side of pixel A of the first low-resolution image, arrange pixel B of the second low-resolution image at the right side of pixel E of the fifth low-resolution image, arrange pixel F of the sixth low-resolution image at the right side of pixel B of the second low-resolution image, arrange pixel C of the third low-resolution image at the lower side of pixel F of the sixth low-resolution image, arrange pixel H of the eighth low-resolution image at the left side of pixel C of the third low-resolution image, arrange pixel D of the fourth low-resolution image at the left side of pixel H of the eighth low-resolution image, and arrange pixel G of the seventh low-resolution image at the left side of pixel D of the fourth low-resolution image.

When high-resolution sub-frames H-1 to H-8 are generated by rearranging the pixels or pixel values, the arithmetic unit may apply the depth information extraction technique to the high-resolution sub-frames H-1 to H-8 and extract high-resolution depth information HRD.

In other words, according to the fifth embodiment, hypothetically, a single 8×8 high-resolution image may be generated using four 4×4 low-resolution images. Here, a high-resolution pixel grid may have 8×8 pixels, which is the same as the pixels of the high-resolution image. Also, here, the low-resolution image may have a meaning that encompasses a low-resolution sub-frame and low-resolution depth information, and the high-resolution image may have a meaning that encompasses a high-resolution sub-frame and high-resolution depth information.

In this way, when all the pixel values of the first to eighth low-resolution images are rearranged on the high-resolution pixel grid, a high-resolution image frame whose resolution is increased by a factor of eight as compared with that of the low-resolution images is generated.

Meanwhile, the arithmetic unit may apply a weighted value to the arranged pixel values. Here, the weighted value may be set differently according to the size of sub-pixels or a travel direction of an optical path or may be set differently for each low-resolution image.

According to an embodiment, the arithmetic unit may shift an input light signal by a method of controlling a slope of a lens assembly, e.g., the IR filter 318 (see FIG. 3) included in the lens assembly. Accordingly, the arithmetic unit may obtain data that is shifted by 1 sub-pixel. The method of controlling the slope may be the same as that described above with reference to FIGS. 13D and 13E.

FIG. 22 is a view for describing an operation mechanism of a sensor according to an embodiment of the present invention.

A sensor 130 may generate a plurality of first electrical signals through a first-phase reference signal and an input light signal received by a first pixel arranged in a $(2n-1)^{th}$ column or a $(2n-1)^{th}$ row among a plurality of first pixels. The sensor 130 may generate a plurality of first electrical signals through a first-phase reference signal and an input light signal received by a first pixel arranged in a first row region. Here, the $(2n-1)^{th}$ column, the $(2n-1)^{th}$ row, and the first row region may refer to an odd-numbered column and an odd-numbered row.

The sensor 130 may generate a third electrical signal through a third-phase reference signal and an input light signal received by a first pixel arranged in the $(2n-1)^{th}$ column or $(2n-1)^{th}$ row among the plurality of first pixels. The sensor 130 may generate a plurality of third electrical signals through the third-phase reference signal and an input light signal received by the first pixel arranged in the first row region. Here, the $(2n-1)^{th}$ column, the $(2n-1)^{th}$ row, and the first row region may refer to an odd-numbered column and an odd-numbered row.

Here, n may be a positive integer, and the first phase and the third phase may have a phase difference of 180°.

Also, the sensor 130 may generate a plurality of second electrical signals through a second-phase reference signal and an input light signal received by a first pixel arranged in a $(2n)^{th}$ column or a $(2n)^{th}$ row among a plurality of first pixels. The sensor 130 may generate a plurality of second electrical signals through the second-phase reference signal and an input light signal received by a first pixel arranged in a second row region. Here, the $(2n)^{th}$ column, the $(2n)^{th}$ row, and the second row region may refer to an even-numbered column and an even-numbered row.

The sensor 130 may generate a fourth electrical signal through a fourth-phase reference signal and an input light signal received by the first pixel arranged in the $(2n)^{th}$ column or $(2n)^{th}$ row among the plurality of first pixels. The sensor 130 may generate a plurality of fourth electrical signals through the fourth-phase reference signal and an input light signal received by the first pixel arranged in the second row region. Here, the $(2n)^{th}$ column, the $(2n)^{th}$ row, and the second row region may refer to an even-numbered column and an even-numbered row.

Here, n may be a positive integer. The second phase and the fourth phase may have a phase difference of 180°, and the second phase may have a phase difference of 90° with the first phase.

An operation mechanism of the sensor 130 according to the first embodiment of the present invention will be described in detail with reference to FIG. 12. FIG. 12(a) shows an in-phase, and FIG. 12(b) shows an out-phase.

As illustrated in FIG. 22(a), in the in-phase, a plurality of first electrical signals E1 that correspond to a first phase may be generated in a plurality of first pixels arranged in a first row and a third row, i.e., $(2n-1)^{th}$ rows. On the other hand, a first electrical signal E2 that corresponds to a second phase may be generated in first pixels arranged in a second row and a fourth row, i.e., $(2n)^{th}$ rows.

Also, as illustrated in FIG. 12(b), in the out-phase, a plurality of third electrical signals E3 that correspond to a third phase may be generated in the plurality of first pixels arranged in the first row and the third row, i.e., the $(2n-1)^{th}$ rows. On the other hand, a fourth electrical signal E4 that corresponds to a fourth phase may be generated in the first pixels arranged in the second row and the fourth row, i.e., the $(2n)^{th}$ rows.

Therefore, in a single integration time that continues from the in-phase to the out-phase, the first electrical signal E1 and the third electrical signal E3 may be generated in the first pixels arranged in the first row and the third row, i.e., the $(2n-1)^{th}$ rows (for example, odd-numbered rows). Also, the second electrical signal E2 and the fourth electrical signal E4 may be generated in the first pixels arranged in the first row and the third row, i.e., the $(2n)^{th}$ rows (for example, even-numbered rows). Therefore, two electrical signals corresponding to different phases may be generated in the first pixels arranged in the $(2n-1)^{th}$ rows and the first pixels arranged in the $(2n)^{th}$ rows.

FIG. 23 is a view for describing first pixel information according to an embodiment of the present invention.

An arithmetic unit 140 may convert first to fourth electrical signals and generate first pixel information. Here, the first pixel information may refer to pixel values of sub-frames generated by converting the first to fourth electrical signals.

For example, in a case in which electrical signals are generated as in FIG. 22, the first pixel information may be as shown in FIG. 23. FIG. 23(a) shows a first sub-frame generated by converting the first electrical signal. The first sub-frame includes first pixel information D1 on four first pixels arranged in the first row and the third row but does not include pixel information on first pixels and pixel information on second pixels arranged in the second row and the fourth row.

FIG. 23(b) shows a second sub-frame generated by converting the second electrical signal. The second sub-frame includes first pixel information D2 on four first pixels arranged in the second row and the fourth row but does not include pixel information on the first pixels and pixel information on the second pixels arranged in the first row and the third row.

FIG. 23(c) shows a third sub-frame generated by converting the third electrical signal. The third sub-frame includes first pixel information D3 on four first pixels arranged in the first row and the third row but does not include the pixel information on the first pixels and the pixel information on the second pixels arranged in the second row and the fourth row.

FIG. 23(d) shows a fourth sub-frame generated by converting the fourth electrical signal. The fourth sub-frame includes first pixel information D4 on four first pixels arranged in the second row and the fourth row but does not include the pixel information on the first pixels and the pixel information on the second pixels arranged in the first row and the third row.

As described above, sub-frame images of four phases that have all the pixel values are required to generate a depth image. However, pixel information generated through an electrical signal only provides some pixel values in each sub-frame image. For example, a first sub-frame image generated through the first pixel information D1 may only have four pixel values among a total of sixteen pixel values. Therefore, the pixel values not generated through the first pixel information in each sub-frame image are required to generate the depth image.

FIGS. 24 and 25 are views for describing a process of computing second pixel information according to an embodiment of the present invention.

An arithmetic unit 140 may compute second pixel information by performing interpolation with respect to first pixel information. Here, the second pixel information may refer to pixel values excluding the first pixel information, among the pixel values of a sub-frame image. That is, the second pixel information may refer to pixel values other than those generated through electrical signal conversion among the pixel values of a sub-frame image.

First, the arithmetic unit 140 may compute second pixel information corresponding to a second pixel by interpolating first pixel information corresponding to a first pixel. As illustrated in FIG. 24, the second pixel information corresponding to the second pixel may be computed by interpolating first pixel information corresponding to a plurality of first pixels adjacent to the second pixel. That is, the second pixel information corresponding to the second pixel may be computed by interpolating first pixel information corresponding to four first pixels which are adjacent to the second pixel from the top, bottom, left, and right thereof. Here, in the case of a second pixel arranged at the outermost portion, the second pixel information may be computed by interpolating first pixel information corresponding to two or three first pixels among the four first pixels adjacent to the second pixel from the top, bottom, left, and right thereof.

Referring to FIG. 24, the arithmetic unit 140 may compute the second pixel information corresponding to the second pixel by interpolating two pieces of first pixel information for each phase. For example, referring to FIG. 24(a), the arithmetic unit 140 may compute the second pixel information on the second pixel by interpolating two pieces of first pixel information D1, which correspond to a first-phase reference signal, and two pieces of first pixel information D2, which correspond to the second phase. For example, referring to FIG. 24(b), the arithmetic unit 140 may compute the second pixel information on the second pixel by interpolating two pieces of first pixel information D3, which correspond to a third-phase reference signal, and two pieces of first pixel information D4, which correspond to the fourth phase. Meanwhile, in the case of a second pixel arranged at the outermost portion, the second pixel information may be computed through two or three pieces of first pixel information.

In this way, the arithmetic unit 140 may compute a pixel value of a second pixel relating to first to fourth sub-frame images that correspond to the first to fourth phases. For example, the second pixel information on the second pixel that is computed in FIG. 24(a) may be set as a pixel value of a second pixel of the first sub-frame image and the second sub-frame image. The second pixel information on the second pixel that is computed in FIG. 24(b) may be set as a pixel value of a second pixel of the third sub-frame image and the fourth sub-frame image.

Next, the arithmetic unit 140 may compute second pixel information corresponding to the first pixel by interpolating the first pixel information corresponding to the first pixel. As illustrated in FIG. 25, the second pixel information corresponding to the first pixel may be computed by interpolating first pixel information corresponding to a plurality of first pixels adjacent to the first pixel. That is, the arithmetic unit 140 may compute the second pixel information corresponding to the first pixel by interpolating first pixel information corresponding to four other first pixels which are adjacent to the first pixel in a diagonal direction.

Referring to FIG. 25, the first pixel information corresponding to the first pixel may have, for each first pixel, first pixel information corresponding to the first phase and the third phase or first pixel information corresponding to the second phase and the fourth phase. That is, a pixel value of a sub-frame image that corresponds to two phases may not be present. Therefore, the arithmetic unit 140 may compute the second pixel information corresponding to the first pixel by interpolating the first pixel information present in the four other first pixels which are adjacent to the first pixel in the diagonal direction.

Detailed description will be given with reference to the examples shown in FIG. 25. Referring to FIG. 25(a), in a sub-frame corresponding to the first phase, first pixels in the first row and the third row may have the first pixel information D1, but first pixels in the second row and the fourth row may not have the first pixel information. Therefore, the arithmetic unit 140 may compute second pixel information B1 by interpolating first pixel information on first pixels disposed in a diagonal direction from the first pixels in the second row and the fourth row.

Referring to FIG. 25(b), in a sub-frame corresponding to the second phase, first pixels in the second row and the fourth row may have first pixel information D1, but first pixels in the first row and the third row may not have the first pixel information. Therefore, the arithmetic unit 140 may compute second pixel information B2 by interpolating first pixel information on first pixels disposed in a diagonal direction from the first pixels in the first row and the third row.

Referring to FIG. 25(c), in a sub-frame corresponding to the third phase, first pixels in the first row and the third row may have first pixel information D3, but first pixels in the second row and the fourth row may not have the first pixel information. Therefore, the arithmetic unit 140 may compute second pixel information B3 by interpolating first pixel information on first pixels disposed in a diagonal direction from the first pixels in the second row and the fourth row.

Referring to FIG. 25(d), in a sub-frame corresponding to the fourth phase, first pixels in the second row and the fourth row may have first pixel information D4, but first pixels in the first row and the third row may not have the first pixel information. Therefore, the arithmetic unit 140 may compute second pixel information B4 by interpolating first pixel information on first pixels disposed in a diagonal direction from the first pixels in the first row and the third row.

FIG. 26 is a view illustrating four sub-frames according to an embodiment.

FIG. 26 shows sub-frames generated through second pixel information computed by the arithmetic unit 140 according to FIGS. 24 and 25.

FIG. 26(a) is a first sub-frame image corresponding to the first phase, FIG. 26(b) is a second sub-frame image corresponding to the second phase, FIG. 26(c) is a third sub-frame image corresponding to the third phase, and FIG. 26(d) is a fourth sub-frame image corresponding to the fourth phase.

The first to fourth sub-frames described above with reference to FIG. 22 only have four pixels among the total of sixteen pixels. However, in a case in which second pixel information is computed according to the embodiment of the present invention, the first to fourth sub-frames may have pixel values of all the sixteen pixels.

FIG. 27 is a view for describing an operation mechanism of a sensor according to an embodiment of the present invention.

Referring to FIG. 27(a), a sensor 130 may generate a plurality of first electrical signals through a first-phase reference signal and an input light signal received by a first pixel arranged in a $(4n-3)^{th}$ row, $(4n-2)^{th}$ column among a plurality of first pixels. Also, the sensor 130 may generate a third electrical signal through a third-phase reference signal and the input light signal received by the first pixel arranged in the $(4n-3)^{th}$ row, $(4n-2)^{th}$ column among the plurality of first pixels. Here, n may be a positive integer, and the first phase and the third phase may have a phase difference of 180°.

The sensor 130 may generate a plurality of second electrical signals through a second-phase reference signal and an input light signal received by a first pixel arranged in a $(4n-2)^{th}$ row, $(4n-3)^{th}$ column among the plurality of first pixels. Also, the sensor 130 may generate a fourth electrical signal through a fourth-phase reference signal and the input light signal received by the first pixel arranged in the $(4n-2)^{th}$ row, $(4n-3)^{th}$ column among the plurality of first pixels. The second phase and the fourth phase may have a phase difference of 180°, and the second phase may have a phase difference of 90° with the first phase. The sensor 130 may also operate according to a modified example shown in FIG. 27(b).

In the embodiment, the arithmetic unit 140 may compute second pixel information corresponding to a certain phase by interpolating first pixel information corresponding to the same phase.

The arithmetic unit 140 may compute second pixel information corresponding to a second pixel by interpolating first pixel information corresponding to a first pixel. Here, the second pixel information corresponding to the second pixel may be computed by interpolating first pixel information corresponding to a plurality of first pixels adjacent to the second pixel.

The arithmetic unit 140 may compute second pixel information corresponding to the first pixel by interpolating the first pixel information corresponding to the first pixel. Here, the second pixel information corresponding to the first pixel may be computed by interpolating first pixel information corresponding to a plurality of first pixels adjacent to the first pixel.

The present invention has been described above with reference to the embodiments thereof, but the embodiments are merely examples and do not limit the present invention. Those of ordinary skill in the art to which the present invention pertains should understand that various modifications and applications not described above are possible within the scope not departing from essential characteristics of the embodiments described herein. For example, each element specifically shown in the embodiments may be modified and practiced. Also, differences relating to such modifications and applications should be interpreted as falling within the scope of the present invention defined by the attached claims.

DESCRIPTION OF REFERENCE NUMERALS

| 100: camera module | 110: light output unit |
|---|---|
| 120: optical unit | 130: sensor |
| 140: control unit | |

The invention claimed is:

1. A camera module comprising:
a light output unit configured to output an optical signal to an object;
an optical unit configured to pass the optical signal reflected from the object;
a sensor configured to receive the optical signal passed by the optical unit; and
a control unit configured to acquire depth information of the object using the optical signal received by the sensor,
wherein the sensor includes an effective area in which a light receiving element is disposed and an ineffective area other than the effective area,
the sensor includes a first row region, in which the effective area and the ineffective area are alternately disposed in a row direction, and a second row region, in which the effective area and the ineffective area are alternately disposed in the row direction and the effective area is disposed at a position not overlapping the effective area of the first row region in a column direction,
light that reaches the effective area of the first row region is controlled by first shifting control to reach the ineffective area of the first row region or the ineffective area of the second row region, and
light that reaches the effective area of the second row region is controlled by the first shifting control to reach the ineffective area of the second row region or the ineffective area of the first row region,
wherein light that reaches the ineffective area of the first row region is controlled by second shifting control to shift toward the ineffective area of the second row region that is adjacent to the ineffective area of the first row region,
wherein the light that reaches the effective area of the first row region is controlled by second shifting control to shift toward the effective area of the second row region that is adjacent to the effective area of the first row region.

2. The camera module of claim 1, wherein a travel distance of light that reaches the sensor by the first shifting control on a plane of the sensor is different from a travel distance of light that reaches the sensor by the second shifting control on the plane of the sensor.

3. The camera module of claim 2, wherein, on the plane of the sensor, the travel distance of the light by the first shifting control is greater than the travel distance of the light that reaches the sensor by the second shifting control.

4. The camera module of claim 3, wherein the travel distance of the light on the plane of the sensor by the first shifting control is 0.3 to 0.7 times a distance between centers of adjacent effective areas in the same row region.

5. The camera module of claim 3, wherein the travel distance of the light on the plane of the sensor by the second shifting control is 0.3 to 0.7 times a distance between a center of the effective area of the first row region and a center of the second row region that is adjacent to the effective area of the first row region.

6. The camera module of claim 3, wherein, on the plane of the sensor, the travel distance of the light by the first shifting control is 0.5 to 1 times the travel distance of the light by the second shifting control.

7. The camera module of claim 1, wherein an optical path is controlled by the optical unit to control light received by the effective area of the first row region to reach the ineffective area of the first row region and shift-control light received by the effective area of the second row region to reach the ineffective area of the second row region.

8. The camera module of claim 7, wherein:
the optical unit includes an infrared pass filter; and
the infrared pass filter is tilted and controlled by the shifting control.

9. The camera module of claim 1, wherein: the optical unit includes a variable lens whose focal point is adjustable; and the variable lens is adjusted and controlled by the shifting control.

10. The camera module of claim 9, wherein the variable lens includes at least one of a liquid lens, which includes at least one liquid, a polymer lens, a liquid crystal lens, a voice coil motor (VCM) lens, a shape memory alloy (SMA) lens, and a microelectromechanical system (MEMS) lens.

11. The camera module of claim 1, further comprising an arithmetic unit configured to acquire depth information of the object by using a time difference between the optical signal output from the light output unit and the optical signal received by the sensor or using a plurality of pieces of information acquired during a plurality of integration times of the sensor during which the effective area of the sensor is integrated at different phases.

12. The camera module of claim 11, wherein the arithmetic unit acquires depth information of higher resolution than the sensor by using pieces of information acquired by the sensor before the shifting control and after the shifting control.

13. The camera module of claim 11, wherein the arithmetic unit applies interpolation between light that reaches the sensor by the first shifting control and light that reaches the sensor by the second shifting control and computes light that reaches a center of the most adjacent light reaching the sensor by the first shifting control and light that is most adjacent to the most adjacent light reaching the sensor by the first shifting control.

* * * * *